(12) United States Patent
Matsumoto

(10) Patent No.: US 8,648,884 B2
(45) Date of Patent: Feb. 11, 2014

(54) DISPLAY DEVICE

(75) Inventor: Shuuichirou Matsumoto, Mobara (JP)

(73) Assignees: Japan Display Inc., Tokyo (JP);
Panasonic Liquid Crystal Display Co., Ltd., Hyogo-ken (JP)

( * ) Notice: Subject to any disclaimer, the term of this patent is extended or adjusted under 35 U.S.C. 154(b) by 752 days.

(21) Appl. No.: 12/505,010

(22) Filed: Jul. 17, 2009

(65) Prior Publication Data

US 2010/0013869 A1 Jan. 21, 2010

(30) Foreign Application Priority Data

Jul. 17, 2008 (JP) ................................. 2008-185719

(51) Int. Cl.
*G09G 5/10* (2006.01)
(52) U.S. Cl.
USPC ............. 345/690; 345/204; 345/100; 345/89; 345/93; 345/103; 340/815.55
(58) Field of Classification Search
USPC ........... 345/690, 98–100, 95, 204, 87, 89, 93, 345/103; 340/815.55
See application file for complete search history.

(56) References Cited

U.S. PATENT DOCUMENTS

| | | | | |
|---|---|---|---|---|
| 5,900,856 | A * | 5/1999 | Iino et al. ....................... | 345/100 |
| 6,310,592 | B1 * | 10/2001 | Moon et al. ..................... | 345/87 |
| 6,621,478 | B1 * | 9/2003 | Sakaguchi et al. ............. | 345/98 |
| 8,284,123 | B2 * | 10/2012 | Higashino ....................... | 345/69 |
| 2005/0122300 | A1 * | 6/2005 | Makuuchi et al. .............. | 345/95 |
| 2006/0038837 | A1 * | 2/2006 | Hong .............................. | 345/691 |
| 2007/0176879 | A1 * | 8/2007 | Makino et al. .................. | 345/98 |
| 2007/0279402 | A1 * | 12/2007 | Inada et al. .................... | 345/204 |
| 2009/0201317 | A1 * | 8/2009 | Endo et al. ..................... | 345/690 |

FOREIGN PATENT DOCUMENTS

JP  2003-107520  4/2003

* cited by examiner

*Primary Examiner* — Lun-Yi Lao
*Assistant Examiner* — Olga Merkoulova
(74) *Attorney, Agent, or Firm* — Antonelli, Terry, Stout & Kraus, LLP.

(57) ABSTRACT

A display device includes a display panel having a plurality of pixels arranged in a matrix, a printed circuit board connected to the display panel, and a first drive circuit and a second drive circuit mounted on the display panel or the printed circuit board, in which each of the first drive circuit and the second drive circuit includes a gray scale voltage generating circuit generating a gray scale voltage to be applied to a first electrode of the pixel based on a gray scale reference voltage and a reference gray scale voltage circuit generating the gray scale reference voltage, and each of the gray scale voltage generating circuit of the first drive circuit and the gray scale voltage generating circuit of the second drive circuit generates the gray scale voltage based on the gray scale reference voltage generated in the reference gray scale voltage circuit of the first drive circuit.

19 Claims, 26 Drawing Sheets

DISPLAY DEVICE

CROSS-REFERENCE TO RELATED APPLICATION

The present application claims priority from Japanese application JP 2008-185719 filed on Jul. 17, 2008, the content of which is hereby incorporated by reference into this application.

BACKGROUND OF THE INVENTION

1. Field of the Invention

The present invention relates to a display device and more particularly to a technology effectively applied to a liquid crystal display device using a plurality of drive circuit components for driving.

2. Background Art

Heretofore, active matrix type liquid crystal display devices have been widely used for, for example, the display units of personal computers (PCs) or television sets. These liquid crystal display devices each include a liquid crystal display panel and a drive circuit driving the liquid crystal display panel. In the conventional liquid crystal display devices, the drive circuit is formed on an IC chip called a driver IC or the like. The IC chip is mounted on a liquid crystal display panel or a printed circuit board connected to a liquid crystal display panel.

Further, the active matrix type liquid crystal display devices have been widely utilized as, for example, the display devices (display modules) of portable electronic devices such as mobile-phone handsets or PDAs. Still further, the liquid crystal display devices have also been used as, for example, the display devices (display modules) of portable computers called notebook computers or the like.

The display devices used for portable computers are generally larger in size (larger screen) and higher in definition (higher resolution) than those used for portable electronic devices such as mobile-phone handsets. Further, it is desired for the display devices used for portable computers in recent years to increase the number of gray scales. Therefore, the liquid crystal display devices used for portable computers are desired to be much higher in definition and more excellent in display quality.

However, in the case where multiple gray scale display is performed with a high-definition liquid crystal display device, for example, there arises a problem that the circuit scale of a drive circuit component is increased. In the liquid crystal display devices used for portable computers, an area for mounting an IC chip having a drive circuit is limited because of, for example, a reduction in the size and thickness of the computers. Therefore, it is desirable to form a drive circuit on a single IC chip. However, in the case where the circuit scale is increased, setting the drive circuit in a single IC chip increases the size of the IC chip, for example. Therefore, it becomes increasingly difficult to mount the IC chip on a limited area.

Accordingly, a method is proposed in which, in the liquid crystal display devices used for portable computers, a plurality of IC chips (drive circuit) are mounted on one liquid crystal display panel, and drive circuits of the respective IC chips are made to cooperate with each other to drive one liquid crystal display panel, for example. As a method for making a plurality of drive circuits mounted on one liquid crystal display panel cooperate with each other, a method for controlling a drive circuit of each IC chip by using an instruction signal is introduced in JP-A-2003-107520, for example.

SUMMARY OF THE INVENTION

In the case of driving one liquid crystal display panel by making a plurality of drive circuits cooperate with each other, a plurality of video signal lines provided on the liquid crystal display panel are each connected to one of the plurality of drive circuits. In this case, one drive circuit generates a gray scale voltage (video signal) applied to a video signal line connected to the drive circuit among the plurality of video signal lines, and outputs the generated gray scale voltage at a predetermined timing.

Also in this case, a plurality of drive circuits (IC chips) mounted on one liquid crystal display panel generally have the same configuration. Each of the drive circuits has a reference gray scale voltage circuit which generates a voltage (gray scale reference voltage) serving as a reference when a gray scale voltage is generated. Each of the drive circuits in the conventional liquid crystal display device generates a gray scale voltage applied to a video signal line based on the gray scale reference voltage generated in the reference gray scale voltage circuit owned by itself.

However, IC chips mounted on a liquid crystal display panel have variations in drive circuit characteristics due to the influence of variations in a manufacturing process even though the IC chips are manufactured using the same material and by the same procedure, for example. Accordingly, for example, the potential of a gray scale reference voltage generated in a reference gray scale voltage circuit varies in some cases even though a plurality of IC chips mounted on one liquid crystal display panel all have the same configuration.

As described above, when the potential of a gray scale reference voltage serving as a reference when a gray scale voltage is generated varies depending on a plurality of IC chips, for example, display quality is different between one portion driven by a certain IC chip and another portion driven by another IC chip, in one display region. Therefore, the conventional liquid crystal display devices in which a plurality of drive circuits (IC chips) are mounted on one liquid crystal display panel have a problem that display non-uniformity occurs to degrade the display quality, for example.

It is an object of the invention to provide a technology capable of preventing the degradation of the display quality of a liquid crystal display device which drives one display region by, for example, making a plurality of drive circuit components cooperate with each other.

The above and other objects, and novel features of the invention will be apparent from the description of the specification and the accompanying drawings.

Typical outlines of the invention disclosed herein will be described below.

(1) A display device includes: a display panel having a plurality of pixels arranged in a matrix; a printed circuit board connected to the display panel; and a first drive circuit and a second drive circuit mounted on the display panel or the printed circuit board, in which the plurality of pixels each have a pixel electrode, each of the first drive circuit and the second drive circuit includes a gray scale voltage generating circuit generating a gray scale voltage to be applied to the pixel electrode based on a gray scale reference voltage and a reference gray scale voltage circuit generating the gray scale reference voltage, the gray scale voltage generating circuit of the second drive circuit is connected to the reference gray scale voltage circuit of the first drive circuit, and each of the gray scale voltage generating circuit of the first drive circuit and the gray scale voltage generating circuit of the second drive circuit generates the gray scale voltage based on the gray scale reference voltage generated in the reference gray scale voltage circuit of the first drive circuit.

(2) In the display device of (1), the first drive circuit and the second drive circuit each have a master/slave selecting circuit which selects which of the reference gray scale voltage circuit provided in the drive circuit and an input terminal of a gray scale reference voltage output from the other drive circuit is to be connected to the gray scale voltage generating circuit, and the master/slave selecting circuit selects which of the reference gray scale voltage circuit and the input terminal is to be connected to the gray scale voltage generating circuit in accordance with the connecting pattern of external terminals of the drive circuit.

(3) In the display device of (1), the reference gray scale voltage circuit of the first drive circuit and the gray scale voltage generating circuit of the second drive circuit are connected to each other via a wiring of the display panel and a wiring of the printed circuit board.

(4) In the display device of (1), the reference gray scale voltage circuit of the first drive circuit and the gray scale voltage generating circuit of the first drive circuit are connected to each other via a wiring of the display panel and a wiring of the printed circuit board, and the reference gray scale voltage circuit of the first drive circuit and the gray scale voltage generating circuit of the second drive circuit are connected to each other via the wiring of the display panel and the wiring of the printed circuit board.

(5) In the display device of (1), the display panel is a liquid crystal display panel having a liquid crystal composition sealed between a pair of substrates.

(6) A display device includes: a display panel having a plurality of pixels arranged in a matrix; a printed circuit board connected to the display panel; and a first drive circuit and a second drive circuit mounted on the display panel or the printed circuit board, the plurality of pixels each having a first electrode and a second electrode, in which each of the first drive circuit and the second drive circuit includes a gray scale voltage generating circuit generating a gray scale voltage to be applied to the first electrode of the pixel based on a gray scale reference voltage, an output amplifier supplying the gray scale voltage generated in the gray scale voltage generating circuit to the first electrode, a bias line supplying a bias current to the output amplifier, and a bias circuit generating the bias current, the bias circuit of the first drive circuit includes a terminal outputting a bias current, the bias line of the second drive circuit is connected to the terminal outputting the bias current of the bias circuit of the first drive circuit, and each of the output amplifier of the first drive circuit and the output amplifier of the second drive circuit is input with the bias current generated in the bias circuit of the first drive circuit.

(7) In the display device of (6), the first drive circuit and the second drive circuit each have a master/slave selecting circuit which selects which of the bias circuit provided in the drive circuit and an input terminal of the gray scale reference voltage output from the other drive circuit is to be connected to the bias line, and the master/slave selecting circuit selects which of the bias circuit and the input terminal is to be connected to the bias line in accordance with the connecting pattern of external terminals of the drive circuit.

(8) In the display device of (6), the first drive circuit has an output terminal outputting a reference current output from the bias circuit, and the supply of the reference voltage from the first drive circuit to the second drive circuit is carried out with the reference current output from the bias circuit.

(9) In the display device of (6), the first drive circuit includes a band-gap circuit generating the reference voltage.

(10) In the display device of (6), the display panel is a liquid crystal display panel having a liquid crystal composition sealed between a pair of substrates.

(11) A display device includes: a display panel having a plurality of pixels arranged in a matrix; a printed circuit board connected to the display panel; and a first drive circuit and a second drive circuit mounted on the display panel or the printed circuit board, the plurality of pixels each having a first electrode and a second electrode, in which each of the first drive circuit and the second drive circuit includes a gray scale voltage generating circuit generating a gray scale voltage to be applied to the first electrode of the pixel based on a gray scale reference voltage, a reference gray scale voltage circuit generating the gray scale reference voltage, and a gamma correction circuit correcting a potential of a gray scale voltage generated in the gray scale voltage generating circuit, the gamma correction circuit of the second drive circuit is connected to the reference gray scale voltage circuit of the first drive circuit, and each of the gamma correction circuit of the first drive circuit and the gamma correction circuit of the second drive circuit corrects the potential of the gray scale voltage based on the gray scale reference voltage generated in the reference gray scale voltage circuit of the first drive circuit.

(12) In the display device of (11), the first drive circuit and the second drive circuit each have a master/slave selecting circuit which selects which of the reference gray scale voltage circuit provided in the drive circuit and an input terminal of a gray scale reference voltage output from the other drive circuit is to be connected to the gamma correction circuit, and the master/slave selecting circuit selects which of the reference gray scale voltage circuit and the input terminal is to be connected to the gamma correction circuit in accordance with the connecting pattern of external terminals of the drive circuit.

(13) In the display device of (11), the reference gray scale voltage circuit of the first drive circuit and the gamma correction circuit of the second drive circuit are connected to each other via a wiring of the display panel and a wiring of the printed circuit board.

(14) In the display device of (11), the reference gray scale voltage circuit of the first drive circuit and the gamma correction circuit of the first drive circuit are connected to each other via a wiring of the display panel and a wiring of the printed circuit board, and the reference gray scale voltage circuit of the first drive circuit and the gamma correction circuit of the second drive circuit are connected to each other via the wiring of the display panel and the wiring of the printed circuit board.

(15) In the display device of (11), the gamma correction circuit includes a variable resistance circuit.

(16) In the display device of (11), the display panel is a liquid crystal display panel having a liquid crystal composition sealed between a pair of substrates.

According to the display device of the invention, for example, it is possible to prevent the degradation of the display quality of a liquid crystal display device which drives one display region by, for example, making a plurality of drive circuits cooperate with each other.

DETAILED DESCRIPTION OF THE EMBODIMENTS

Figure 1A:
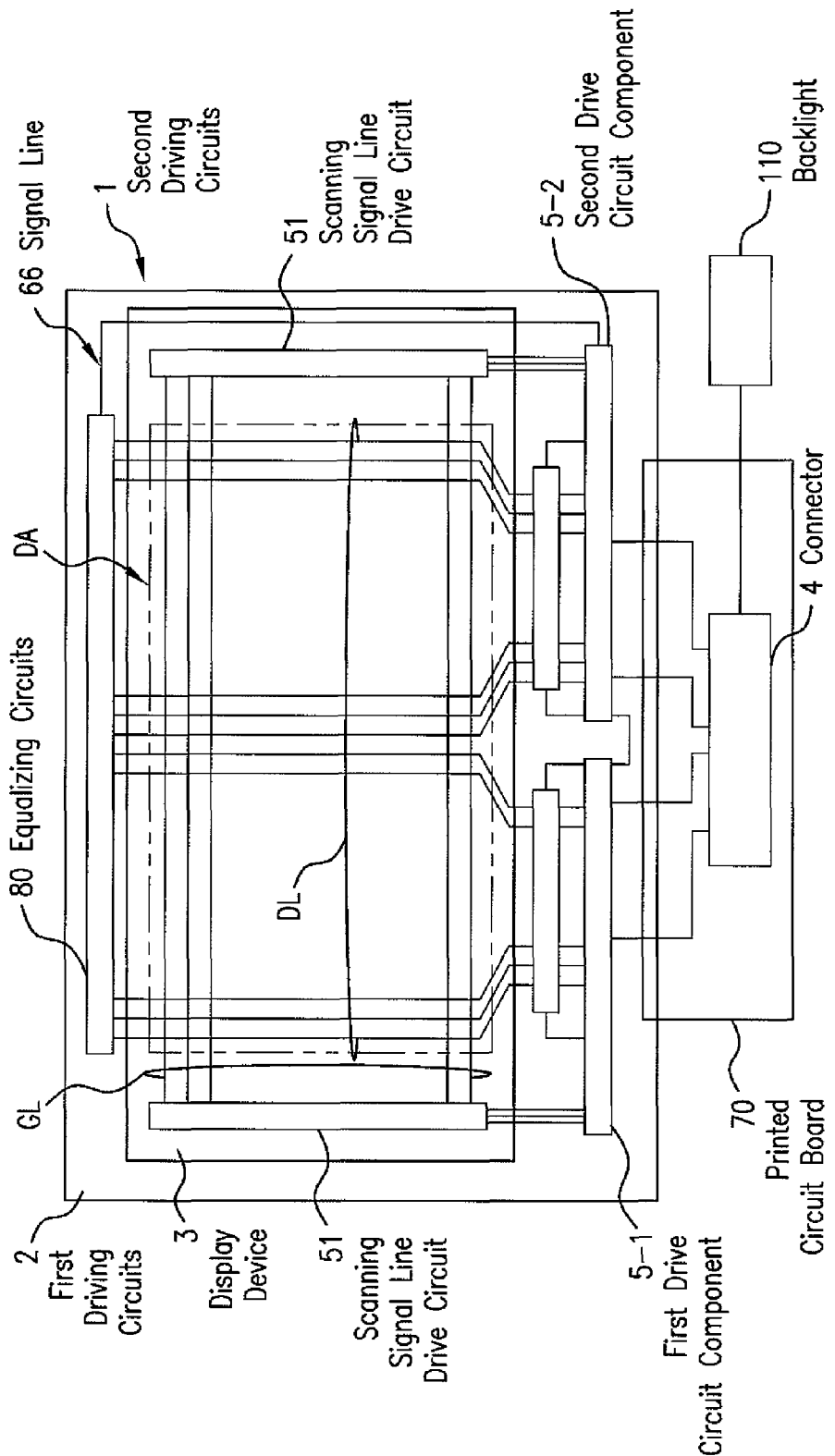
FIG. 1A is a schematic block diagram showing an exemplary schematic configuration of a liquid crystal display device according to an embodiment of the invention.

Hereinafter, the invention will be described in detail with reference to the drawings together with an embodiment.

Throughout the drawings for explaining the embodiment, elements having the same function are denoted by the same reference numerals and signs, and the repetitive description thereof is omitted.

FIGS. 1A to 1E are schematic views showing a schematic configuration and a driving method of a liquid crystal display device according to an embodiment of the invention.

Figure 1B:
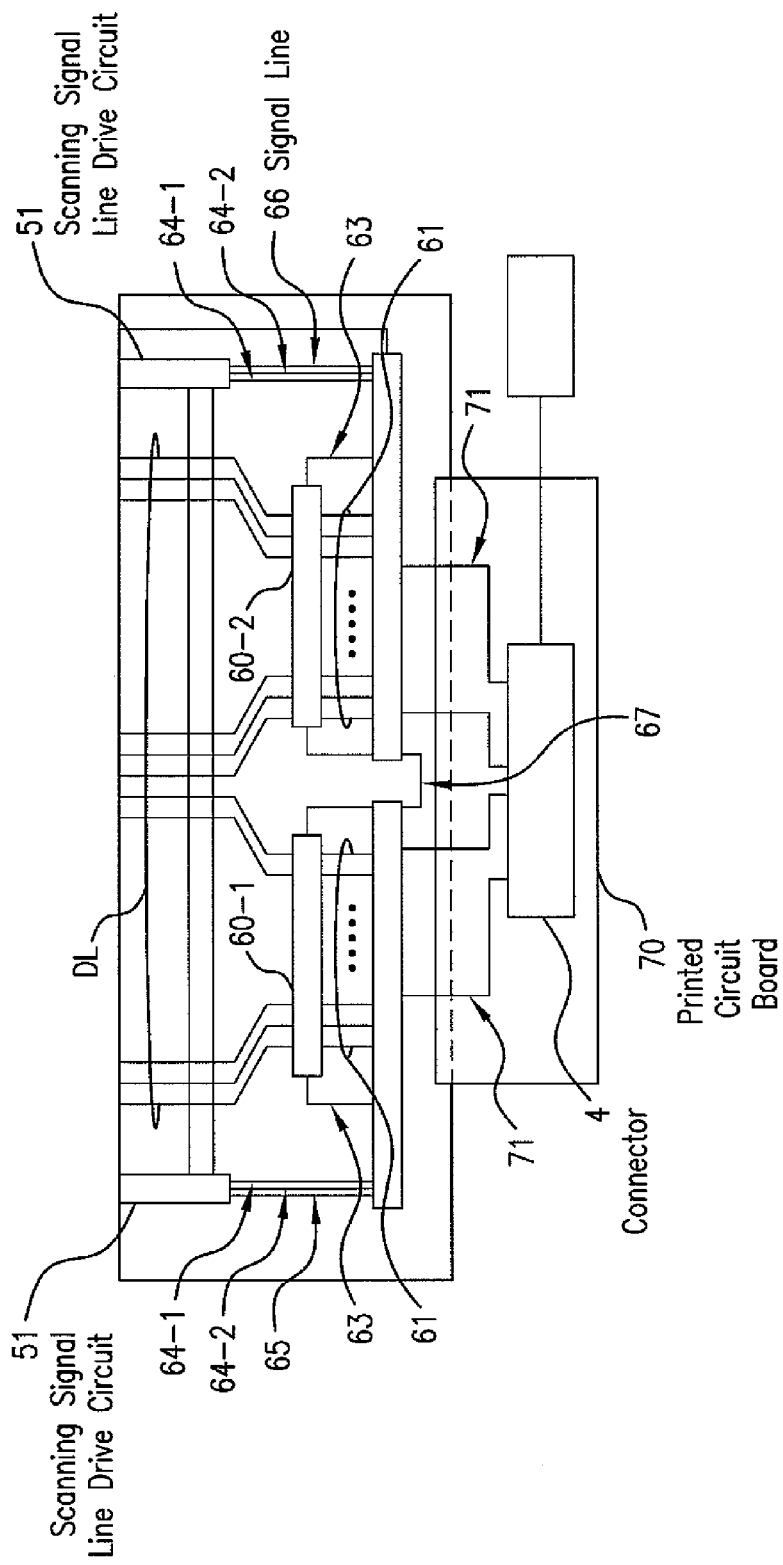
FIG. 1B is a schematic block diagram showing drive circuits, distribution circuits, and their surroundings in FIG. 1A in an enlarged fashion.
Figure 1C:
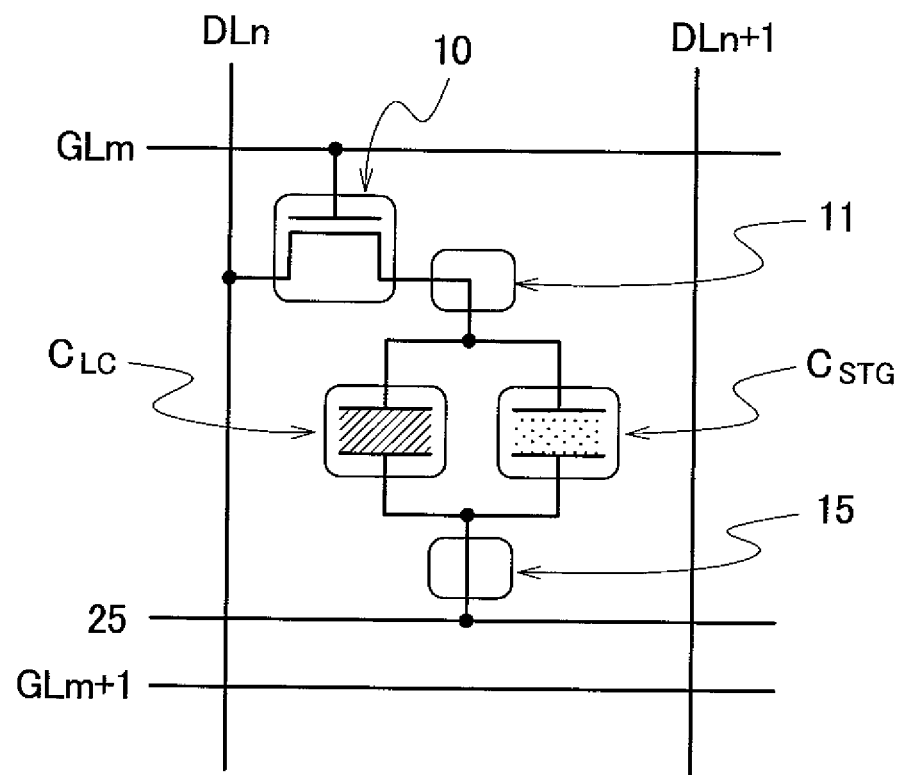
FIG. 1C is a schematic circuit diagram showing an exemplary circuit configuration of one pixel of a liquid crystal display panel.
Figure 1D:
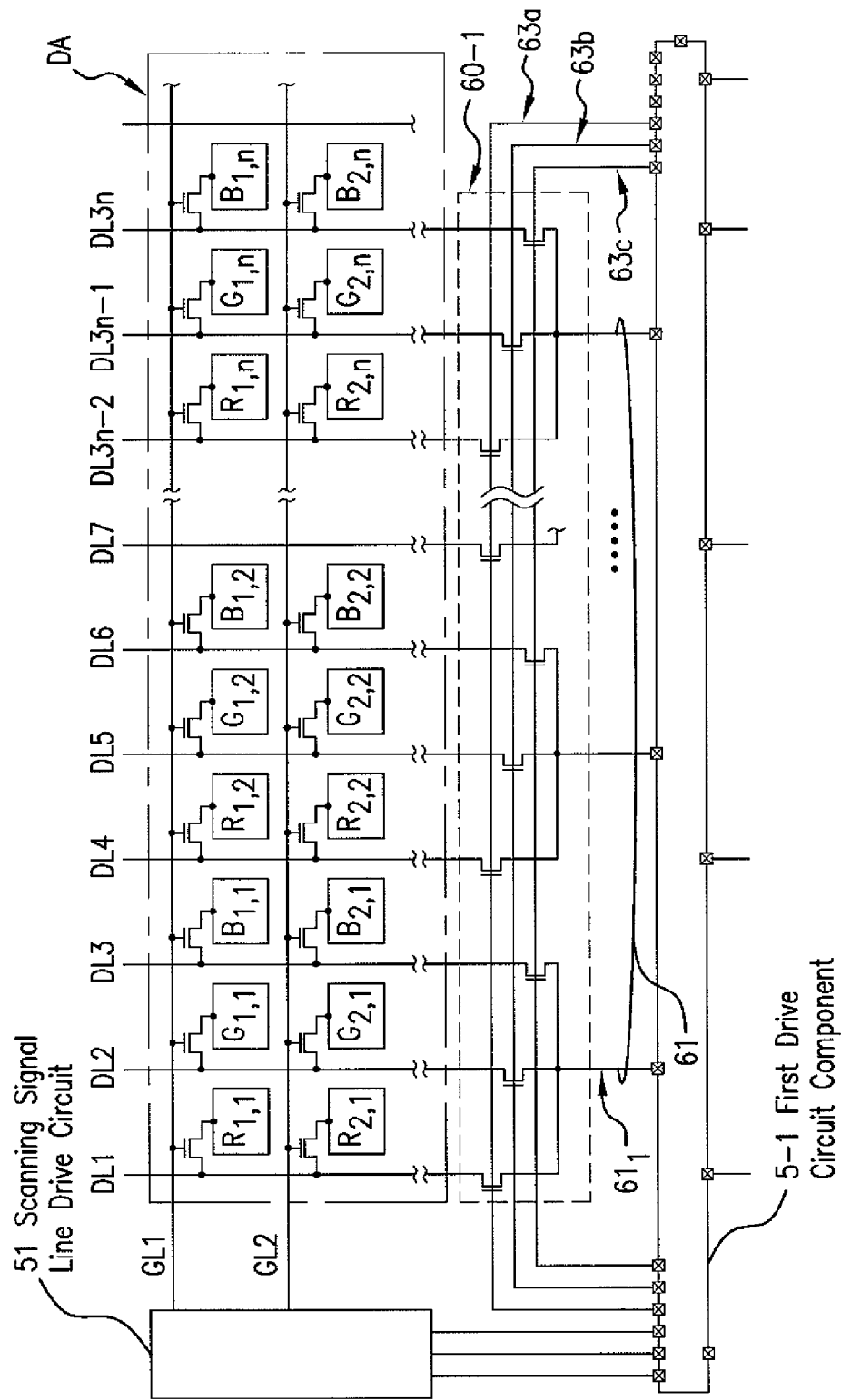
FIG. 1D is a schematic circuit diagram showing exemplary circuit configurations of a display region and a distribution circuit.
Figure 1E:
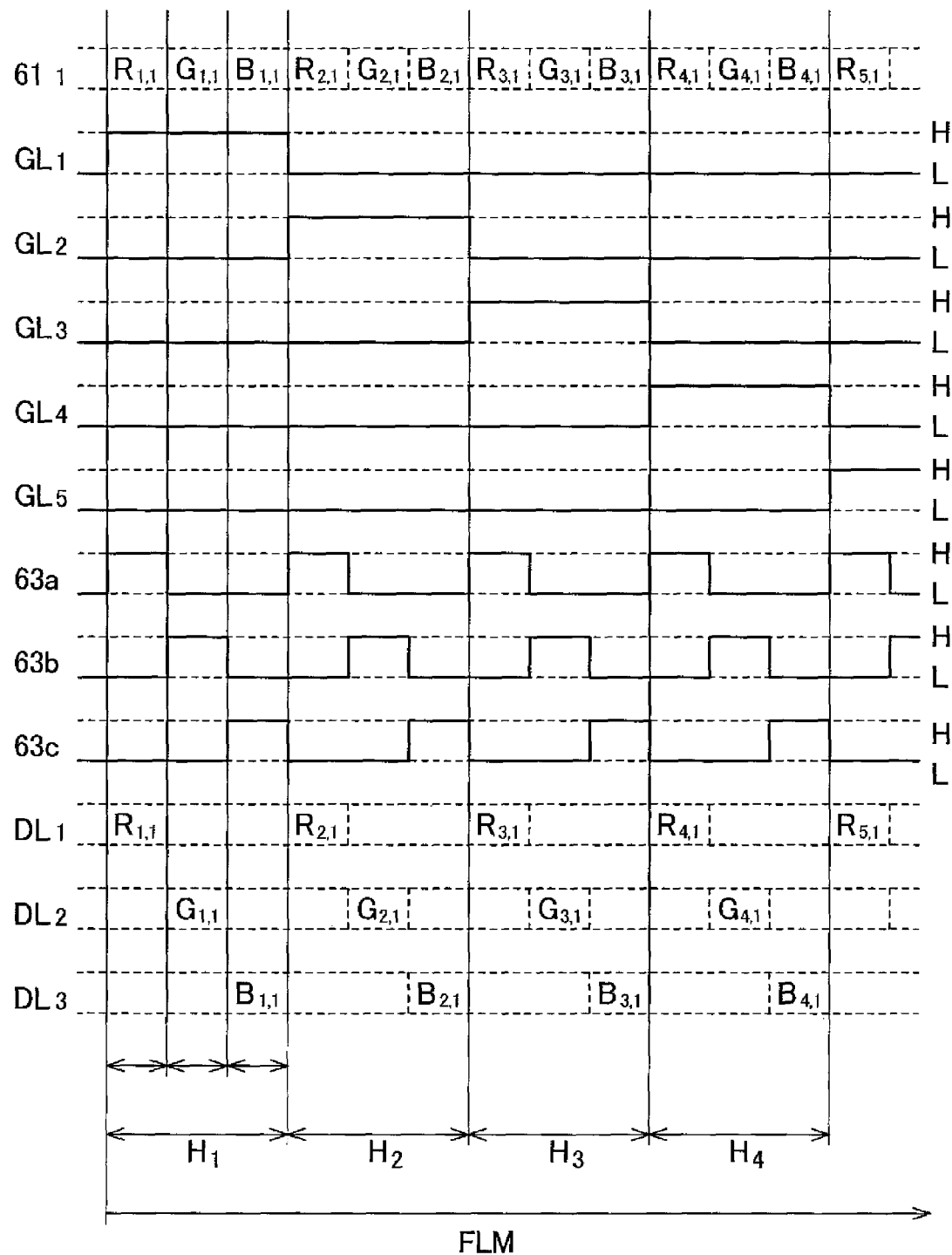
FIG. 1E is a schematic view showing an exemplary method for driving the liquid crystal display device of the embodiment.

FIG. 1A is a schematic block diagram showing an exemplary schematic configuration of the liquid crystal display device according to the embodiment of the invention. FIG. 1B is a schematic block diagram showing drive circuits, distribution circuits, and their surroundings in FIG. 1A in an enlarged fashion. FIG. 1C is a schematic circuit diagram showing an exemplary circuit configuration of one pixel of a liquid crystal display panel. FIG. 1D is a schematic circuit diagram showing exemplary circuit configurations of a display region and a distribution circuit. FIG. 1E is a schematic view showing an exemplary method for driving the liquid crystal display device of the embodiment.

The liquid crystal display device of the embodiment is assumed as a WXGA class one with a display region of 1366×3 pixels wide by 768 pixels high, for example, in which one liquid crystal display panel is driven by using two drive circuit components. In this case, the liquid crystal display device of the embodiment includes, for example, a liquid crystal display panel 1, a first drive circuit component 5-1, a second drive circuit component 5-2, a printed circuit board 70, a backlight 110, a not-shown housing case, and the like as shown in FIG. 1A.

The liquid crystal display panel 1 is a display panel having a first substrate 2 (hereinafter referred to as TFT substrate) and a second substrate 3 (hereinafter referred to as color filter substrate) overlapped with each other at a predetermined gap and a liquid crystal composition (not shown) interposed between the TFT substrate 2 and the color filter substrate 3. The TFT substrate 2 and the color filter substrate 3 are bonded together with, for example, an annular seal material (not shown) surrounding a display region. The liquid crystal composition is sealed in a space surrounded by the TFT substrate 2, the color filter substrate 3, and the seal material.

The liquid crystal display panel 1 includes, for example, pairs of polarizers and retarders disposed so as to interpose the TFT substrate 2 and the color filter substrate 3 therebetween.

The TFT substrate 2 includes a plurality of scanning signal lines GL (also referred to as scanning lines or gate lines) and a plurality of video signal lines DL (also referred to as video lines, data lines, or drain lines).

Although only part of the scanning signal lines GL are shown in FIG. 1A, a larger number (for example, 768) of the scanning signal lines GL are provided in an actual TFT substrate 2. Each of the scanning signal lines GL has a portion passing through a display region DA, and the portion passing through the display region DA extends in the x-direction. The portion of each of the scanning signal lines GL, which passes through the display region DA, is arranged in parallel in the y-direction. Further, each of the scanning signal lines GL is connected to a scanning signal line drive circuit 51.

Although only part of the video signal lines DL are shown in FIG. 1A, a larger number (for example, 4098) of the video signal lines DL are provided in an actual TFT substrate 2. Each of the video signal lines DL has a portion passing through the display region DA, and the portion passing through the display region DA extends in the y-direction. The portion of each of the video signal lines DL, which passes through the display region DA, is arranged in parallel in the x-direction. In the liquid crystal display device of the embodiment, as shown in FIG. 1B, the plurality of video signal lines DL are arranged in the right and left halves of the display region DA. The video signal lines DL arranged in the left half of the display region DA are connected to the first drive circuit component 5-1 via a first distribution circuit 60-1. The video signal lines DL arranged in the right half of the display region DA are connected to the second drive circuit component 5-2 via a second distribution circuit 60-2.

The display region DA of the liquid crystal display panel 1 is composed of the assembly of a plurality of pixels arranged in a matrix. In the display region DA, a region occupied by one pixel corresponds to a region surrounded by two adjacent scanning signal lines GL and two adjacent video signal lines DL, for example. In this case, as shown in FIG. 1C, one pixel has, for example, a first TFT element 10, a pixel electrode connected to the source of the first TFT element 10, and a counter electrode 15 connected to a common wiring 25. Further, one pixel has, for example, a pixel capacitor $C_{LC}$ (also referred to as liquid crystal capacitor) and a holding capacitor $C_{STG}$ (also referred to as auxiliary capacitor or storage capacitor).

The first TFT element 10 is connected to a video signal line $DL_n$ of two adjacent video signal lines $DL_n$ and $DL_{n+1}$ at the drain thereof, while connected to a scanning signal line $GL_m$ of two adjacent scanning signal lines $GL_m$ and $GL_{m+1}$ at the gate thereof. In this case, the first TFT element 10 functions as a switching element (active element) for supplying the pixel electrode 11 with a gray scale voltage (video signal) applied from the first drive circuit component 5-1 or the second drive circuit component 5-2 to the video signal line $DL_n$.

Although the source and drain of the first TFT element 10 are sometimes reversed from each other due to the relationship of bias, the terminal connected to the video signal line DL is referred to as drain in the specification.

The display region DA in the liquid crystal display panel 1 of the embodiment may adopt any of various configurations applied to conventional liquid crystal display panels, or may adopt any of their applied or modified configuration. In the embodiment, therefore, the description of the configuration, such as a planar layout, of the display region DA in an actual liquid crystal display panel 1 is omitted.

Each of the first drive circuit component 5-1 and the second drive circuit component 5-2 is an IC chip mounted on the TFT substrate 2 or a semiconductor package having the IC chip. Each of the first drive circuit component 5-1 and the second drive circuit component 5-2 has a gray scale voltage generating circuit generating a gray scale voltage (video signal) to be applied to a video signal line (pixel electrode of each pixel).

The first drive circuit component 5-1 is connected to the plurality of video signal lines DL arranged in the left half of the display region DA via relay signal lines 61 and the first distribution circuit 60-1. The first distribution circuit 60-1 is a circuit selecting the video signal line DL which supplies a video signal output from the first drive circuit component 5-1 to one of the relay signal lines 61, with a circuit configuration shown in FIG. 1D, for example.

Each of the plurality of relay signal lines 61 connected to the first distribution circuit 60-1 is connected to a video signal output terminal of the first drive circuit component 5-1 at one end thereof. Three adjacent video signal lines DL are connected to each of the relay signal lines 61 via second TFT elements (not shown). Three control signal lines 63a, 63b, and 63c connected to the first drive circuit component 5-1 pass through the first distribution circuit 60-1. The gate of the second TFT element is connected to any of the three control signal lines 63a, 63b, and 63c. The gates of three second TFT elements connected to each of the relay signal lines 61 are respectively connected to different control signal lines.

Each of the control signal lines 63 (63a, 63b, and 63c) may be connected to the first drive circuit component 5-1 only at one end thereof. However, in the case of a liquid crystal display device having the high-definition liquid crystal display panel 1 like the liquid crystal display device of the embodiment, each of the control signal lines 63 (63a, 63b, and 63c) is preferably connected to the first drive circuit component 5-1 at both ends thereof as shown in FIG. 1D. In this manner, when a control signal is supplied from the both ends of the first distribution circuit 60-1 via the control signal lines 63, waveform rounding of the control signal applied to the control signal lines 63 can be reduced even when the portions of the control signal lines 63, which pass through the first distribution circuit 60-1, are long.

The first drive circuit component 5-1 is connected to the scanning signal line drive circuit 51 arranged on the left side of the display region via signal lines 64-1, 64-2 and 65. The signal lines 64-1 and 64-2 are counter electrode signal lines supplying the counter electrode 15 with a voltage of a common potential, while the signal line 65 is a signal line transmitting a scanning timing signal.

The second distribution circuit 60-2 interposed between the video signal lines DL arranged in the right half of the display region and the second drive circuit component 5-2 has the same circuit configuration as that of the first distribution circuit 60-1.

The second drive circuit component 5-2 is connected to the scanning signal line drive circuit 51 arranged on the right side of the display region via the signal lines 64-1, 64-2 and 65. The signal lines 64-1 and 64-2 are counter electrode signal lines, while the signal line 65 is a signal line transmitting a scanning timing signal.

The second drive circuit component 5-2 is connected to an equalizing circuit 80 via a signal line 66.

The first distribution circuit 60-1, the second distribution circuit 60-2, the scanning signal line drive circuit 51, and the equalizing circuit 80 are each an integrated circuit having a plurality of TFT elements, and incorporated into the TFT substrate 2. That is, the TFT elements or passive elements of the first distribution circuit 60-1, second distribution circuit 60-2, scanning signal line drive circuit 51, and equalizing circuit 80 are formed above an insulating substrate such as a glass substrate in the stage of forming the TFT substrate 2 together with the first TFT element 10 or the like of the display region.

In the liquid crystal display device of the embodiment, a printed circuit board is connected to one of long sides of the TFT substrate 2, and a connector 4 is provided on the printed circuit board. The connector 4 is connected to an external signal line, and a signal from the outside of the liquid crystal display device is input to the connector 4. A wiring 71 is provided between the connector 4 and the first drive circuit component 5-1 and between the connector and the second drive circuit component 5-2. Signals from the outside are transmitted to the first drive circuit component 5-1 and the second drive circuit component 5-2 via the wiring 71.

Control signals transmitted from an externally provided control device (not shown) and a power supply voltage supplied from an external power supply circuit (not shown) are input to the first drive circuit component 5-1 and the second drive circuit component 5-2 via the connector 4 and the wiring 71.

Signals input from the outside to the first drive circuit component 5-1 and the second drive circuit component 5-2 are control signals including a clock signal, a display timing signal, a horizontal synchronizing signal, and a vertical synchronizing signal, display data for designating a gray scale of each pixel, and display mode control commands. The first drive circuit component 5-1 and the second drive circuit component 5-2 drive the liquid crystal display panel 1 based on these input signals.

The liquid crystal display device of the embodiment is provided with the backlight 110. The transmission amount or reflection amount of light irradiated from the backlight 110 onto the liquid crystal display panel 1 is controlled for each pixel to display a video or an image. The backlight 110 is a planar lighting device having a light source such as a light-emitting diode (LED) or a cold cathode fluorescent tube, for example. Power for making the light source emit light is supplied from the outside of the liquid crystal display device via the wiring and connector of a flexible board.

When the liquid crystal display device is driven by the first drive circuit component 5-1, the second drive circuit component 5-2, and the scanning signal line drive circuit 51, signals shown in FIG. 1E are output from the respective circuits, for example.

Each of the first drive circuit component 5-1 and the second drive circuit component 5-2 supplies control signals for driving the scanning signal lines GL to the scanning signal line drive circuit 51 via the signal line 65. The scanning signal line drive circuit 51 supplies the scanning signals shown in FIG. 1E to each of the scanning signal lines GL based on a reference clock to be generated in the first drive circuit component 5-1 or the second drive circuit component 5-2. FIG. 1E shows scanning signals supplied to five scanning signal lines $GL_1$, $GL_2$, $GL_3$, $GL_4$, and $GL_5$ on the upper end side of the display region DA.

A scanning signal supplied to each of the scanning signal lines GL is a signal whose one cycle is one frame period FLM, in which the potential is at an H level only one horizontal scanning period H of the one frame period FLM and is at an L level in the other periods. The H level is a potential level at which the first TFT element 10 is turned ON (conductive state), while the L level is a potential level at which the first TFT element 10 is turned OFF (non-conductive state). The one horizontal scanning period H is a period obtained by dividing the one frame period FLM by the number of the scanning signal lines GL, for example. During one horizontal scanning period $H_m$, only the scanning signal of one scanning signal line $GL_m$ has a potential at the H level.

Each of the first drive circuit component 5-1 and the second drive circuit component 5-2 outputs a gray scale voltage (video signal) corresponding to a gray scale to be displayed by a pixel to the relay signal lines 61. As for the gray scale voltage output from the first drive circuit component 5-1 to one relay signal line $61_1$, three gray scale voltages R, G, and B to be supplied to respective three video signal lines $DL_1$, $DL_2$, and $DL_3$ connected to the relay signal line 61, via the first distribution circuit 60-1 are output during one horizontal scanning period as shown in FIG. 1E, for example.

Each of the first drive circuit component 5-1 and the second drive circuit component 5-2 outputs a control signal synchronized with a scanning signal and a gray scale voltage to the control signal lines 63a, 63b, and 63c. The potential of the control signal output to the control signal lines 63a, 63b, and 63c is at the H level only in one selection period of one horizontal scanning period, and at the L level in the other periods, with one horizontal scanning period as one cycle, for example. The one selection period is a period obtained by dividing one horizontal scanning period by the number of the control signal lines, for example. During the one selection period, only the control signal of one control signal line has a potential at the H level.

When the gray scale voltage output from the first drive circuit component 5-1 and the second drive circuit component 5-2, the scanning signal to be supplied to the scanning signal line GL, and the control signal to be supplied to the control signal lines 63a, 63b, and 63c are switched at the timing shown in FIG. 1E, the gray scale voltage output to the relay signal line $61_1$ can be distributed to predetermined video signal lines $DL_1$, $DL_2$, and $DL_3$. Accordingly, the number of gray scale voltage output terminals in the first drive circuit component 5-1 and the second drive circuit component 5-2 can be reduced by using the first distribution circuit 60-1 and the second distribution circuit 60-2, like the liquid crystal display device of the embodiment.

Figure 2:
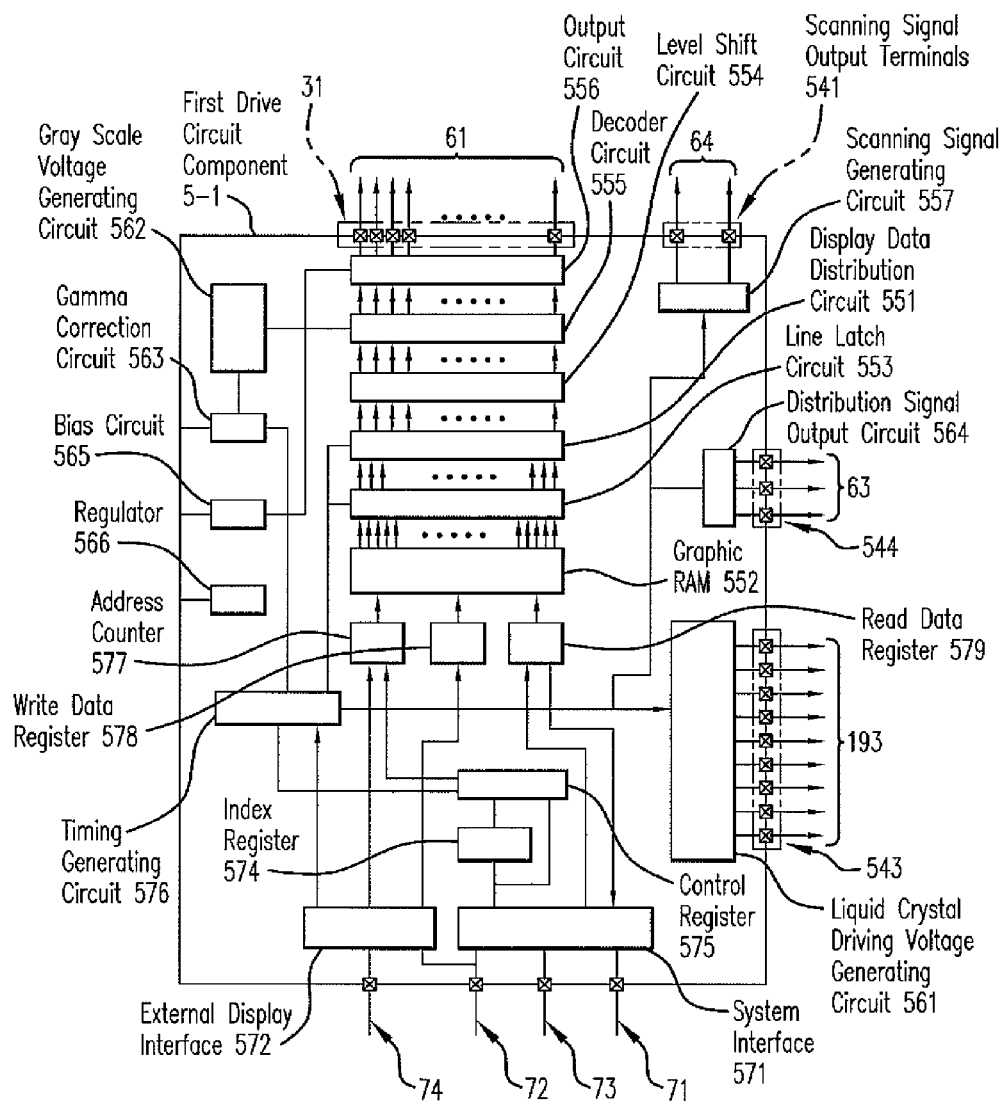
FIG. 2 is a schematic block diagram showing an exemplary internal configuration of a first drive circuit component.

FIG. 2 is a schematic block diagram showing an exemplary internal configuration of the first drive circuit component.

In the liquid crystal display device of the embodiment, drive circuit components (IC chips) having the same configuration are used as the first drive circuit component 5-1 and the second drive circuit component 5-2. Therefore, in the embodiment, the configuration of the first drive circuit component 5-1 will be described as an exemplary configuration of a drive circuit component.

The first drive circuit component 5-1 has a system interface 571 and an external display interface 572. Signals input from the outside are input to the system interface 571 via the input wiring 71. Part of a video signal is also input to the external display interface 572.

In this case, the first drive circuit component 5-1 has the following configuration, and signals or voltages necessary for driving the liquid crystal display panel 1 are output from scanning signal output terminals 541, video signal output terminals 31, or voltage output terminals 544 which are output terminals.

The first drive circuit component 5-1 incorporates a graphic RAM 552 therein and stores display data in the graphic RAM 552. In the case of driving the liquid crystal display panel 1, the first drive circuit component 5-1 designates an address of the graphic RAM 552 in accordance with the liquid crystal display panel 1 and writes display data in the graphic RAM 552. The first drive circuit component 5-1 outputs a gray scale voltage to the liquid crystal display panel 1 based on the display data in the graphic RAM 552.

The first drive circuit component 5-1 has various display modes. The various display modes can be designated from the outside via the system interface 571, and the first drive circuit component 5-1 can be controlled also for, for example, the reference value of a gray scale voltage by using an instruction signal. In this manner, the first drive circuit component 5-1 can support various display modes based on an instruction signal, and realizes a multifunctional circuit by forming driving functions on a single IC chip to suppress the mounting area to small one.

In recent years, mobile phones having a variety of functions have been developed. Therefore, liquid crystal display devices used for mobile phones support a variety of functions in addition to the various display modes.

Accordingly, also the first drive circuit component 5-1 supports a variety of functions and is required to control each of the functions. The first drive circuit component 5-1 used for the liquid crystal display device of the embodiment includes registers, the values of which are set to execute each of the functions.

The first drive circuit component 5-1 can adopt, for example, an auto-sequence function to prevent the complicated setting of many registers. However, since the auto-sequence function needs to previously decide a function to be supported, it is custom-designed for each liquid crystal display panel. Therefore, it is necessary to prepare drive circuits with different specifications for respective liquid crystal display panels.

Further, an EPROM is provided separately from the first drive circuit component 5-1 to store the set values of the resisters in order to operate the respective liquid crystal display panel, and an instruction signal is input from an external control circuit to the first drive circuit component 5-1, whereby it is possible to read necessary set values from the EPROM.

Generally, an instruction signal is set via the system interface 571. The system interface 571 includes, for example, two kinds of interfaces, that is, any n-bit, such as 18-bit or 16-bit, bus interface and a clock synchronous serial interface. The system interface 571 can support a parallel signal and a serial signal transmitted from the external control circuit, such as a micro processing unit (MPU).

The first drive circuit component 5-1 has an index register 574 and a control register 575, which are 16-bit registers, and a write data register 578 and a read data register 579, which are 18-bit registers. Data is read or written from/to each of the registers via the system interface 571. Reference numeral 71 in FIG. 2 denotes an input signal line, and reference numeral 72 denotes an output signal line. Reference numeral 73 denotes a verify signal output line. The matching of input and output data can be performed with a verify signal.

The external display interface 572 includes an RGB interface and a vertical synchronous interface for moving picture display and receives a video signal via an input signal line 74 for external signal supply. When the RGB interface is operating, the external display interface 572 receives display data in response to a vertical synchronizing signal and a horizontal synchronizing signal supplied from the outside.

When the vertical synchronous interface is operating, the external display interface 572 establishes synchronization between frames in response to a vertical synchronizing signal and receives display data in response to an internal clock.

The index register 574 is a register for storing access information of the control register 575 or the graphic RAM 552. The index register 574 can designate the addresses of the control register 575 and the graphic RAM 552.

The control register 575 can designate various functions of the first drive circuit component 5-1. The first drive circuit component 5-1 can control the display operation by the value set in the control register 575. For example, the control register 575 can designate the number of signal lines to be driven for a timing generating circuit 576.

The write data register 578 temporarily stores data to be written into the graphic RAM 552. The write data register 578 writes the temporarily stored display data into the graphic RAM 552 via the external display interface 572 in accordance with a set value in the control register 575, a value in an address counter 577, and the values of the various control terminals.

The read data register 579 is a register for temporarily storing data read from the graphic RAM 552 and outputs the temporarily stored data to the outside in accordance with the set value in the control register 575, the value in the address counter 577, and the values of the various control terminals.

The address counter 577 is a counter for giving an address to the graphic RAM 552. When an instruction to set an address is written into the index register 574, address information is transferred from the index register 574 to the address counter.

The graphic RAM 552 incorporates a static RAM (SRAM) for storing bit pattern data of 1,180,224 bytes with 18 bits per pixel, for example, and supports display of up to 2049 (683RGB)×768 size.

The timing generating circuit 576 is a circuit which generates a timing signal for operating an internal circuit necessary for display. For example, the timing generating circuit 576 generates an interface signal including a read timing signal for the graphic RAM 552 necessary for display and an internal operation timing signal for an access from the outside.

A latch circuit 553 temporarily holds digital data corresponding to 683×3 outputs of the video signal lines DL. When the latch circuit 553 prepares a signal to be output, the latch circuit 553 outputs the display data to a display data distribution circuit 551.

The display data distribution circuit 551 outputs display data to a level shift circuit 554 in accordance with the operation of the first distribution circuit 60-1. The level shift circuit 554 shifts the voltage level of a signal held by the latch circuit 553 so that the voltage can be controlled in a decoder circuit 555.

The decoder circuit 555 outputs a gray scale voltage in accordance with an input signal. The voltage output from the decoder circuit 555 is current-amplified by an output circuit 556, and the resultant voltage is output to the video signal output terminal 31.

The video signal output terminals 31 are electrically connected to the video signal lines DL of the liquid crystal display panel 1 via the relay signal lines 61 and the first distribution circuit 60-1. By performing the control shown in FIG. 1E, the output gray scale voltage is supplied (distributed) to a predetermined video signal line DL. The number of the video signal lines DL to which a gray scale voltage is output, the position of the video signal line DL for which the output is started, and the like are set in the control register 575 in response to an instruction signal.

A gray scale voltage generating circuit 562 generates a gray scale voltage and supplies the generated voltage to the decoder circuit 555. A gamma correction circuit 563 approximates the rate of increase/decrease of a gray scale voltage to the gamma function to achieve a change in luminance suitable for the characteristics of a human eye. A bias circuit 565 generates a bias voltage used in the output circuit 556. A regulator 566 outputs a power supply voltage for an internal logic circuit. The gamma correction circuit 563 and the bias circuit 565 will be described later in detail.

The first drive circuit component 5-1 includes a scanning signal generating circuit 557 for the scanning signal line GL. A scanning timing signal is output from the scanning signal generating circuit 557 to the scanning signal output terminal 541 and transmitted to the scanning signal line drive circuit 51 on the liquid crystal display panel 1.

The first drive circuit component 5-1 also includes a distribution signal output circuit 564. Signals for switching the ON/OFF of the switching elements (second TFT elements)

provided in the first distribution circuit 60-1 are output to the control signal lines 63 on the liquid crystal display panel via terminals 544.

A liquid crystal driving voltage generating circuit 561 generates a voltage applied to the liquid crystal display panel 1.

Figure 3:
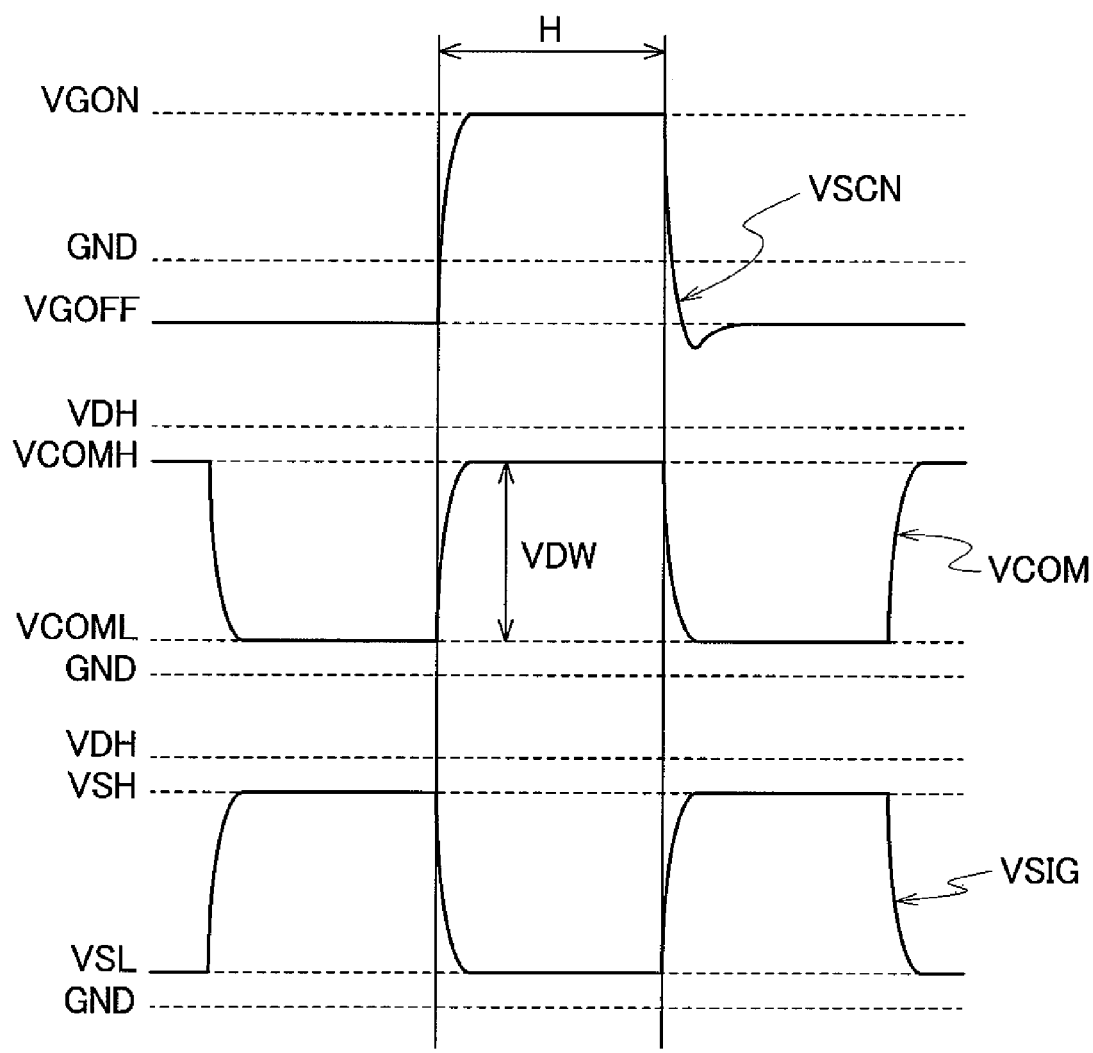
FIG. 3 is a schematic waveform diagram showing exemplary waveforms of voltages applied to a liquid crystal display panel 1.

FIG. 3 is a schematic waveform diagram showing exemplary waveforms of voltages applied to the liquid crystal display panel 1.

When the liquid crystal display panel is driven, the polarity of each pixel must be reversed at a constant cycle, for example. The term "polarity of each pixel" as used herein refers to the relationship between the potential of a pixel electrode and the potential of a counter electrode upon expressing a gray scale. When a gray scale is expressed at equal to or higher than the potential of a counter electrode, it is called a positive polarity, while when a gray scale is expressed at equal to or lower than the potential of a counter electrode, it is called a negative polarity.

In some cases, the liquid crystal display panel is driven by a driving method called a line inversion drive, for example. The line inversion drive is a driving method in which, for example, all pixels arranged in an extending direction of a scanning signal line have the same polarities, and two pixels adjacent in the extending direction of the scanning signal line have inverted polarities in view of the polarity of each pixel in one frame period.

When the liquid crystal display panel is driven by the line inversion drive, a driving method called a common inversion drive is combined together in many cases, for example.

When the liquid crystal display panel is driven by the line inversion drive combined with the common inversion drive, the waveforms of the voltages applied to scanning signal lines, counter electrodes, and pixel electrodes of the liquid crystal display panel 1 are waveforms shown in FIG. 3, for example.

A scanning signal VSCN is a scanning signal output from the scanning signal line drive circuit 51 to one scanning signal line GL. The scanning signal VSCN becomes a voltage VGON at the H level only in a certain one horizontal scanning period H during one frame period and becomes a voltage VGOFF at the L level in the other periods during one frame period.

The liquid crystal driving voltage generating circuit 561 generates the voltage VGON at the H level and the voltage VGOFF at the L level in a scanning signal and outputs the voltages from the output terminals 543. The voltage VGON at the H level and the voltage VGOFF at the L level in a scanning signal are transmitted to the scanning signal line drive circuit 51 via the signal line 65 of the TFT substrate 2 together with the above-described scanning timing signal.

In the case of a common inversion drive method for each line, a voltage VCOM of a counter electrode is inverted between VCOMH and VCOML for each horizontal scanning period H. In this case, a video signal VSIG is inverted in accordance with the inversion of the voltage VCOM of a counter electrode so that it is AC driven.

In FIG. 3, the VCOMH is a voltage at the H level in a counter electrode, while the VCOML is a voltage at the L level in a counter electrode. VDW is an amplitude reference voltage showing the amplitude of the voltage of a counter electrode.

A voltage VSH of the video signal VSIG is a positive gray scale voltage, in which a gray scale voltage supplied to a pixel is a positive signal with respect to the voltage VCOM of a counter electrode. A voltage VSL is a negative gray scale voltage which is negative with respect to the voltage VCOM of a counter electrode. A voltage VDH is a gray scale reference voltage serving as a reference of the positive gray scale voltage VSH or the voltage VCOMH of a counter electrode at the H level.

As described above, when the common inversion drive method is employed, a large potential difference between the video signal VSIG and the voltage VCOM of a counter electrode can be obtained even if the amplitude of the video signal VSIG is small. Therefore, low voltage driving and low power consumption can be achieved.

Although FIG. 3 shows the waveforms of the voltages in the case of the common inversion drive in which the polarity is inverted for each horizontal scanning period H for facilitating the description, this is not restrictive. In the case of the common inversion drive, the voltage of a counter electrode may be inverted for each several horizontal scanning periods, for example.

As for a selection signal for driving the first distribution circuit 60-1, signals having the waveforms shown in FIG. 1E are generated in the distribution signal output circuit 564, for example, and the generated signals are output to the control signal lines.

Figure 4A:
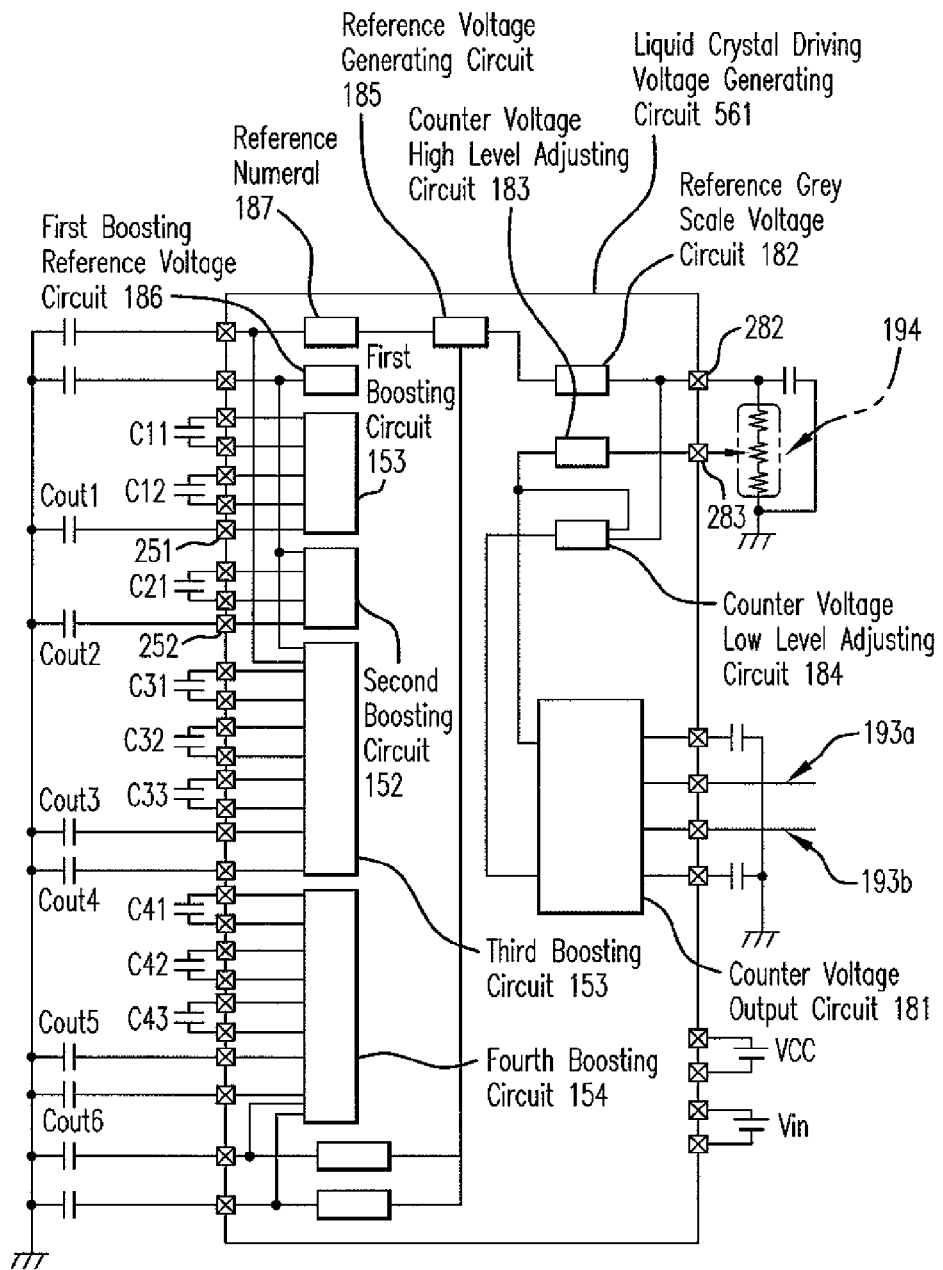
FIG. 4A is a schematic block diagram showing an exemplary overall configuration of a liquid crystal driving voltage generating circuit.
Figure 4B:
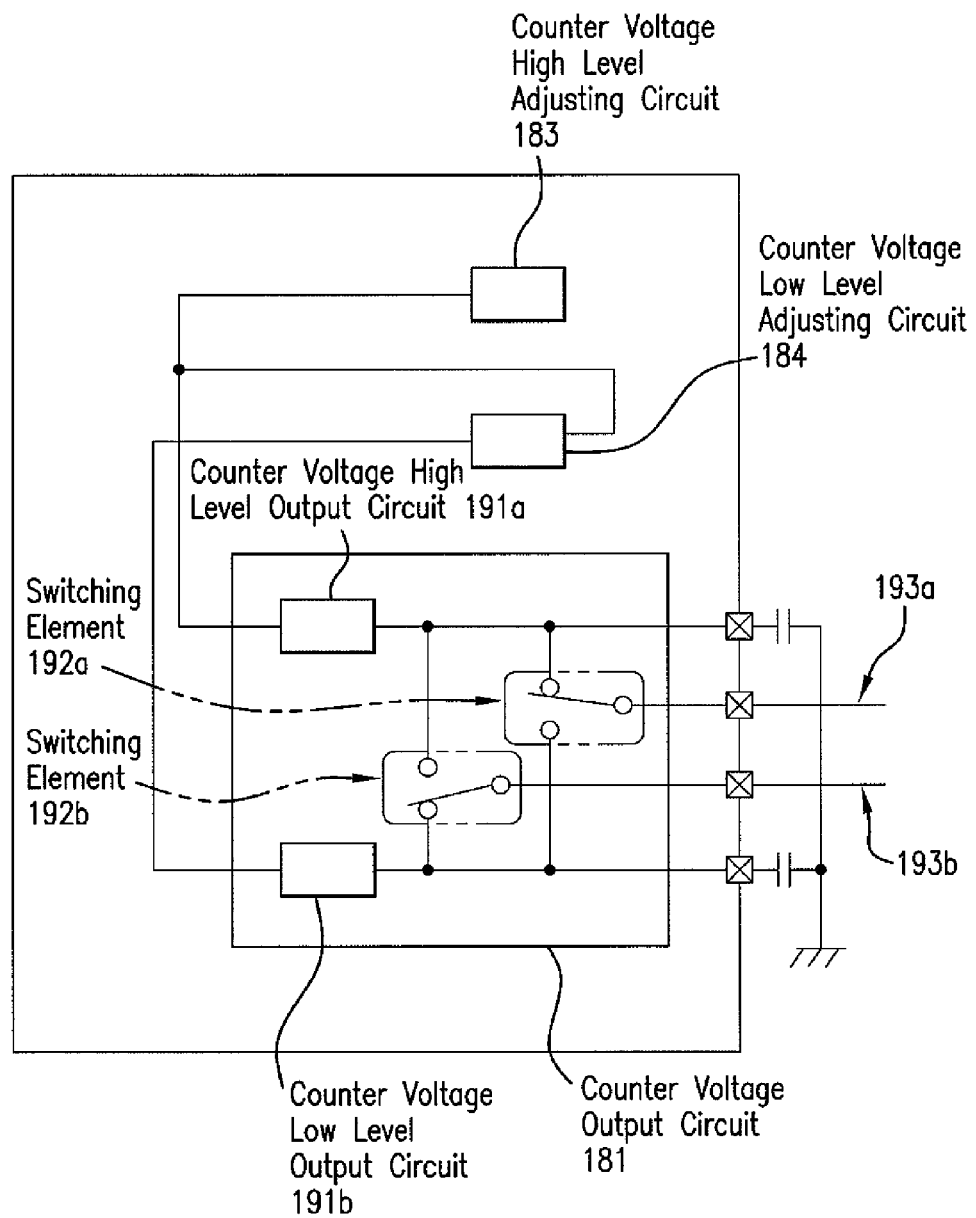
FIG. 4B is a schematic block diagram showing an exemplary configuration of a counter voltage output circuit 181 in FIG. 4A.

FIGS. 4A and 4B are schematic block diagrams showing an exemplary configuration of the liquid crystal driving voltage generating circuit.

FIG. 4A is a schematic block diagram showing an exemplary overall configuration of the liquid crystal driving voltage generating circuit. FIG. 4B is a schematic block diagram showing an exemplary configuration of a counter voltage output circuit 181 in FIG. 4A.

In the first drive circuit component 5-1, the liquid crystal driving voltage generating circuit 561 is configured as shown in FIGS. 4A and 4B, for example.

A reference gray scale voltage circuit 182 outputs the gray scale reference voltage VDH serving as a reference of a counter voltage and a gray scale voltage based on a reference voltage VREF output from a reference voltage generating circuit 185. A counter voltage high level adjusting circuit 183 outputs the counter electrode high voltage VCOMH from the gray scale reference voltage VDH.

The output of the reference gray scale voltage circuit 182 is applied to a variable resistance 194 via an output terminal 282. The counter voltage high level adjusting circuit 183 generates the voltage VCOMH of a counter electrode at the H level from a voltage input from the variable resistance 194. A counter voltage low level adjusting circuit 184 sets the amplitude reference voltage VDW of a counter voltage to generate the voltage VCOML of a counter electrode at the L level.

The counter voltage high level adjusting circuit 183 can generate the voltage VCOMH of a counter electrode without using the variable resistance 194, based on an adjusted value held by internal non-volatile memory, fuse circuit, or the like, such that the voltage VCOMH has a voltage value obtained by multiplying the gray scale reference voltage VDH by the adjusted value. The variable resistance 194 may be controlled by a register with the use of variable resistance circuits 605 which will be described later.

The output of the counter voltage high level adjusting circuit 183 is input to a counter voltage high level output circuit 191a of the counter voltage output circuit 181. The output of the counter voltage low level adjusting circuit 184 is input to a counter voltage low level output circuit 191b of the counter voltage output circuit 181.

The voltage VCOMH of a counter electrode is output from the counter voltage high level output circuit 191a and input to a switching element 192a and a switching element 192b. Similarly, the voltage VCOML of a counter electrode is output from the counter voltage low level output circuit 191b and input to the switching element 192a and the switching element 192b.

The switching elements 192a and 192b are formed so as to switch outputs from the counter voltage high level output circuit 191a and the counter voltage low level output circuit 191b, and the connection between a first counter voltage output terminal 193a and a second counter voltage output terminal 193b, to each other at a constant cycle. Therefore, during a first period, the voltage VCOMH of a counter electrode can be output from the first counter voltage output terminal 193a, and the voltage VCOML of a counter electrode can be output from the second counter voltage output terminal 193b. Whereas, during a second period, the voltage VCOML of a counter electrode can be output from the first counter voltage output terminal 193a, and the voltage VCOMH of a counter electrode can be output from the second counter voltage output terminal 193b.

The first counter voltage output terminal 193a and the second counter voltage output terminal 193b are connected to the counter electrode signal line 64-1 or 64-2 on the liquid crystal display panel 1 to transmit the voltages VCOMH and VCOML of a counter electrode to the scanning signal line drive circuit 51.

Reference numeral 186 in the liquid crystal driving voltage generating circuit 561 denotes a first boosting reference voltage circuit, which outputs a reference voltage VCI for a first boosting circuit 151, a second boosting circuit 152, and a third boosting circuit 153. Reference numeral 187 denotes a second boosting reference voltage circuit, which outputs a reference voltage VDCDC for the third boosting circuit 153.

The first boosting circuit 151 generates a power supply voltage DDVDH used for the circuits outputting video signals to the video signal output terminals 31. The power supply voltage DDVDH is generated by boosting the reference voltage VCI. That is, the power supply voltage DDVDH is used in the line latch circuit 553, the level shift circuit 554, the decoder circuit 555, and the output circuit 556. The power supply voltage DDVDH is output from a terminal 251 to which a first holding capacitor Cout1 is connected.

The second boosting circuit 152 generates a power supply voltage VCL for driving the counter voltage low level output circuit 191b. The power supply voltage VCL is generated by boosting the reference voltage VCI. The power supply voltage VCL is output from a terminal 252 to which a second holding capacitor Cout2 is connected.

The third boosting circuit 153 generates the voltages VGON and VGOFF used in the scanning signal line drive circuit 51. The voltages VGON and VGOFF are generated by boosting the reference voltages VCI and VDCDC.

A fourth boosting circuit 154 generates voltages VSWH and VSWL output from the distribution signal output circuit 564. The voltages VSWH and VSWL are generated by boosting reference voltages VCI2 and VDCDC2A. The reference voltage VCI2 is output from a third boosting reference voltage circuit 188, while the reference voltage VDCDC2A is output from a fourth boosting reference voltage circuit 189.

Capacitors C11, C12, C21, C31, C32, C33, C41, C42, and C43 in FIG. 4A are boosting capacitors and used for the boosting operation for each of the boosting circuits. The capacitors Cout1 and Cout2, and capacitors Cout3, Cout4, Cout5, and Cout6 are holding capacitor elements connected to the output terminals of the boosting circuits.

As described above, the output terminals 543 of the liquid crystal driving voltage generating circuit 561 shown in FIG. 2 are, in fact, connected to the boosting circuits as shown in FIG. 4A, and the various voltages are output from the liquid crystal driving voltage generating circuit 561.

Figure 5:
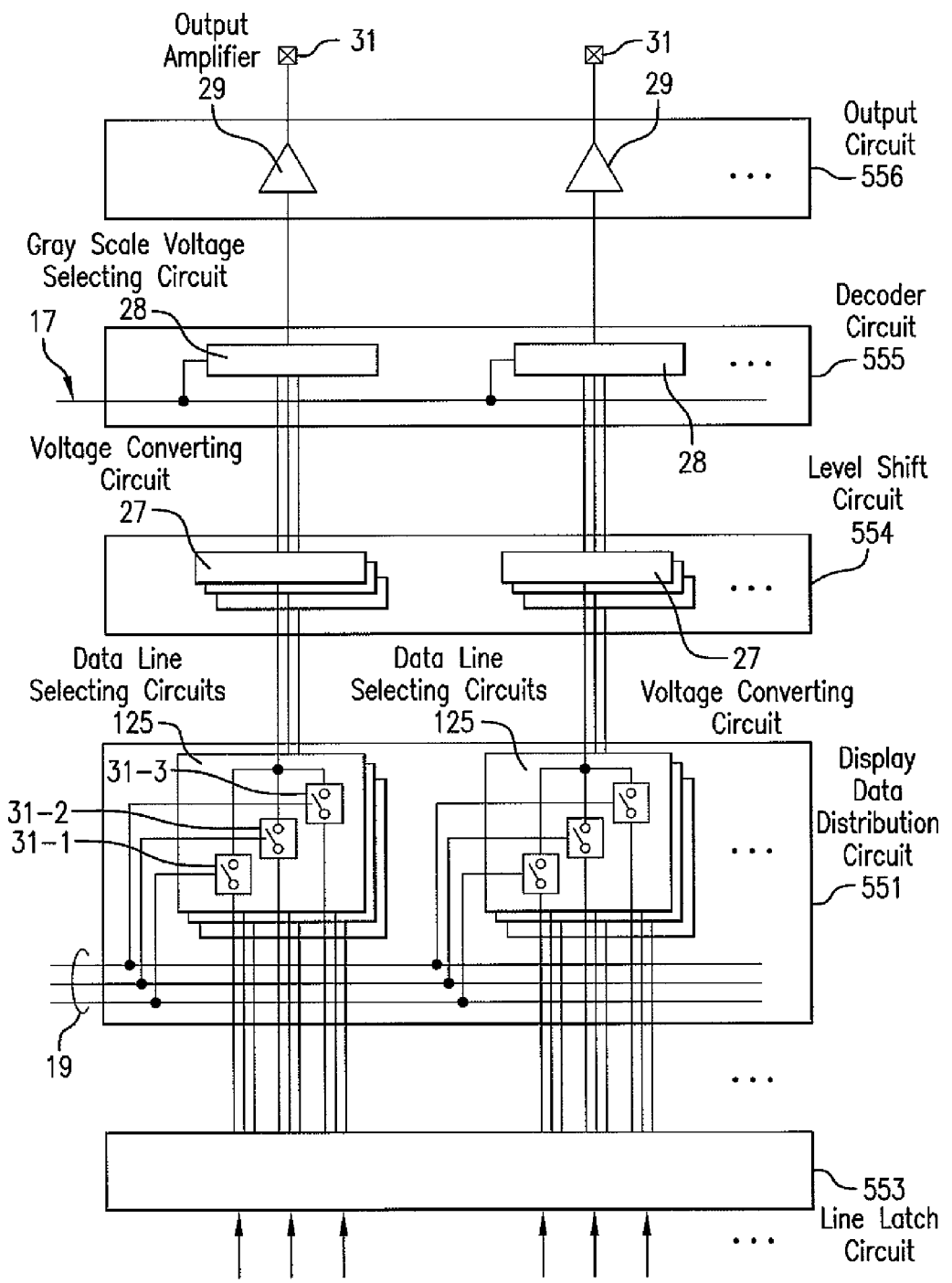
FIG. 5 is a schematic view for explaining a method for outputting a gray scale voltage in the first drive circuit component.

FIG. 5 is a schematic view for explaining a method for outputting a gray scale voltage in the first drive circuit component.

In the first drive circuit component 5-1, time-division signal lines 19 for inputting time-division signals are connected to the display data distribution circuit 551 as shown in FIG. 5, for example. The time-division signal lines are connected to the timing generating circuit 576 shown in FIG. 2, and the time-division signals are output from the timing generating circuit 576.

The time-division signal lines 19 are connected to each of data line selecting circuits 125 of the display data distribution circuit 551. A time-division signal input to the data line selecting circuit 125 controls the data line selecting circuit 125. The data line selecting circuit 125 selects display data output by the line latch circuit 553 in accordance with the time-division signal and outputs the selected data to the level shift circuit 554 (voltage converting circuit 27) of the next stage. That is, although the line latch circuit 553 outputs display data during one horizontal scanning period, different display data is sequentially transmitted to the voltage converting circuit 27 depending on the periods divided by the display data distribution circuit 551.

In this case, display data is input from the display data distribution circuit 551 to the level shift circuit 554 (voltage converting circuit 27) in accordance with the operation of the first distribution circuit 60-1.

In the voltage converting circuit 27, display data of logic signal level is converted to that of voltage level which can be driven by the decoder circuit 555. In FIG. 5, although display data is represented by 3 bits for avoiding the complication of the drawing, it is assumed that there are circuits corresponding to the number of gray scales which can be output in the first drive circuit component 5-1.

Display data is supplied from the level shift circuit to the decoder circuit 555. The decoder circuit 555 has a gray scale voltage selecting circuit 28, which selects a gray scale voltage in accordance with the display data. In this case, a plurality of gray scale voltages are supplied to the gray scale voltage selecting circuit 28 through a gray scale voltage line 17. In FIG. 5, although one gray scale voltage line 17 is shown, it is assumed that the gray scale voltage line 17 includes as many wirings as corresponding to the number of gray scales which can be output in the first drive circuit component 5-1.

The gray scale voltage selected by the decoder circuit 555 (gray scale voltage selecting circuit 28) is current-amplified by an output amplifier 29 to be output from the video signal output terminal 31.

Next, the gray scale voltage selecting circuit 28 will be described using FIG. 6.

Figure 6:
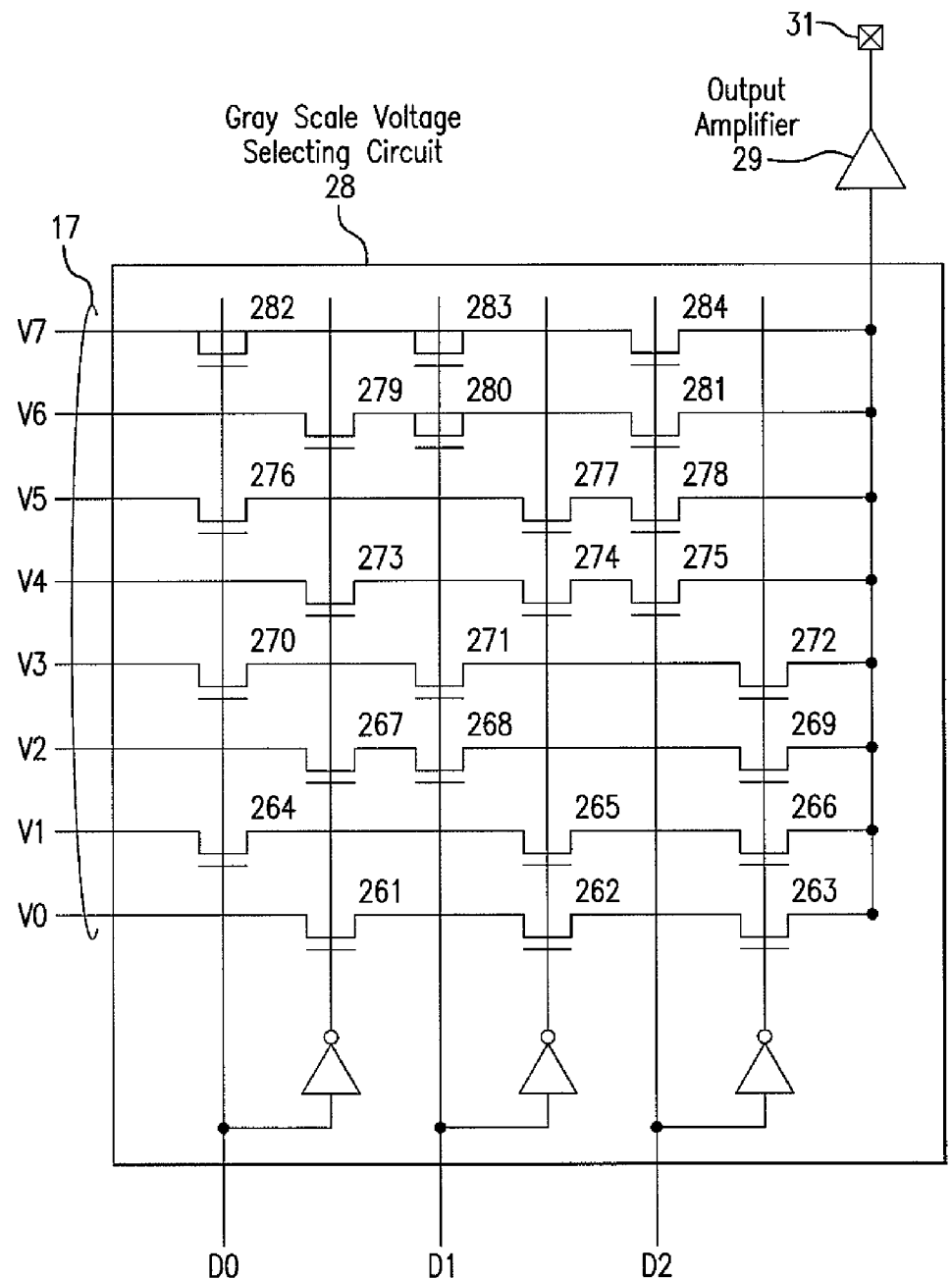
FIG. 6 is a schematic circuit diagram showing an exemplary schematic configuration of a gray scale voltage selecting circuit.

FIG. 6 is a schematic circuit diagram showing an exemplary schematic configuration of the gray scale voltage selecting circuit.

The gray scale voltage selecting circuit 28 shown in FIG. 5 has the circuit configuration shown in FIG. 6, for example. FIG. 6 shows the case where display data is composed of three bits of D0, D1, and D2 for avoiding the complication of the drawing. FIG. 6 also shows the case where the gray scale voltage line 17 is composed of eight wirings of V0 to V7 through which the voltages of eight gray scales are supplied.

The gray scale voltage selecting circuit 28 has 24 switching elements 261 to 284. Any of the display data D0, D1, and D2 is input to the control terminals (gates) of the switching elements 261 to 284.

Accordingly, in the case where the display data D0, D1, and D2 are (0, 0, 0), the switching elements 261, 262, and 263 are brought into an ON state, whereby the gray scale voltage selecting circuit 28 selects the gray scale voltage V0 to output the same to the output amplifier 29.

In the case where the display data D0, D1, and D2 are (1, 0, 0), the switching elements 264, 265, and 266 are brought into the ON state, whereby the gray scale voltage selecting circuit 28 selects the gray scale voltage V1 to output the same to the output amplifier 29. In the same manner, a gray scale voltage can be selected in accordance with display data until the display data D0, D1, and D2 become (1, 1, 1) to output the gray scale voltage V7. That is, the gray scale voltage selecting circuit 28 connects only one of the plurality of the gray scale voltage lines 17 to the output amplifier 29 corresponding to the combination of the display data D0, D1, and D2, and applies the voltage supplied to the gray scale voltage line 17 to the output amplifier 29.

The first drive circuit component 5-1 generates voltages corresponding to the gray scale voltages which the first drive circuit component can output in the gray scale voltage generating circuit 562.

Next, the gray scale voltage generating circuit 562 will be described using FIG. 7.

Figure 7:
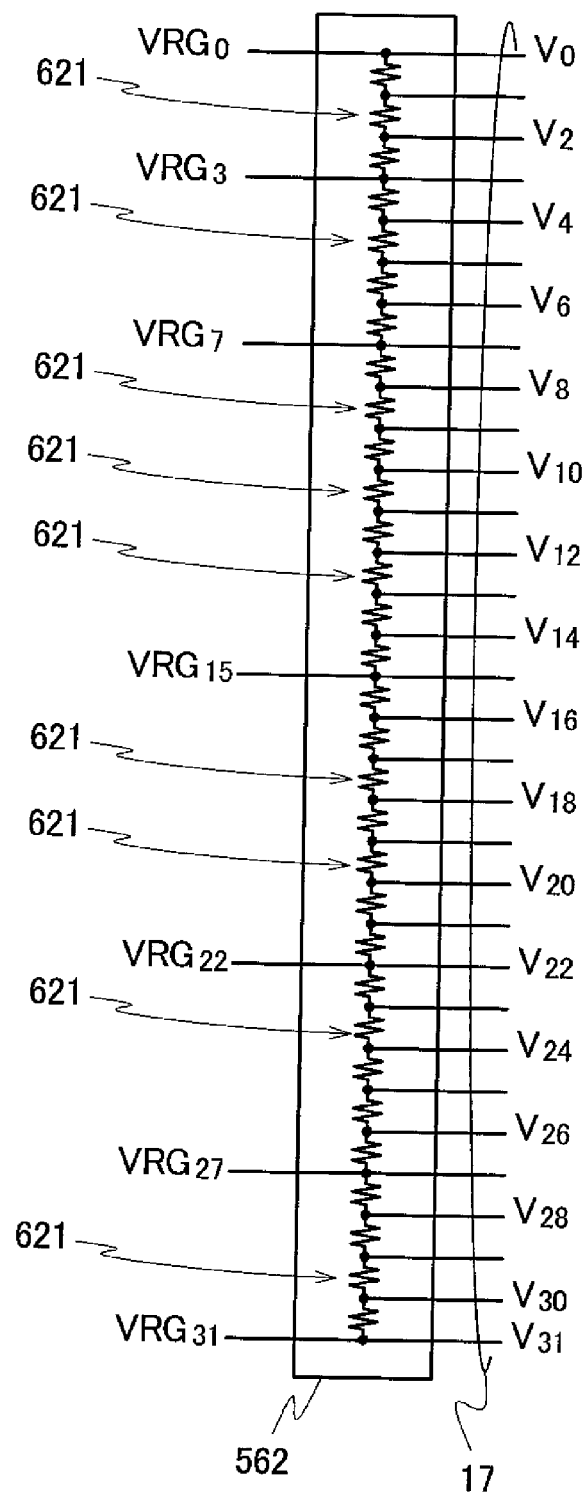
FIG. 7 is a schematic circuit diagram showing an exemplary schematic configuration of a gray scale voltage generating circuit.

FIG. 7 is a schematic circuit diagram showing an exemplary schematic configuration of the gray scale voltage generating circuit.

The gray scale voltage generating circuit 562 is composed of a ladder resistance circuit having a plurality of resistances connected in series.

In the case where the number of output voltages in the gray scale voltage generating circuit 562 is 32, the gray scale voltage generating circuit 562 divides reference gray scale voltages $VRG_0$ to $VRG_{31}$ by the 31 resistances 621 and outputs gray scale voltages $V_0$ to $V_{31}$ as shown in FIG. 7, for example. Although FIG. 7 shows the case where the number of output voltages is 32, an actual gray scale voltage generating circuit 562 can output as many voltages as corresponding to the number of output gray scales in the first drive circuit component 5-1 (for example, 256 voltages).

Further, for example, $VRG_0$, $VRG_3$, $VRG_7$, $VRG_{15}$, $VRG_{22}$, $VRG_{27}$, and $VRG_{31}$ are input from the outside to the gray scale voltage generating circuit 562 as reference gray scale voltages. In this manner, the reference gray scale voltages VRG are provided in plural numbers to adjust the respective potential differences between the reference gray scale voltages, whereby the change in gray scale voltage can be approximated to the gamma function.

Figure 8:
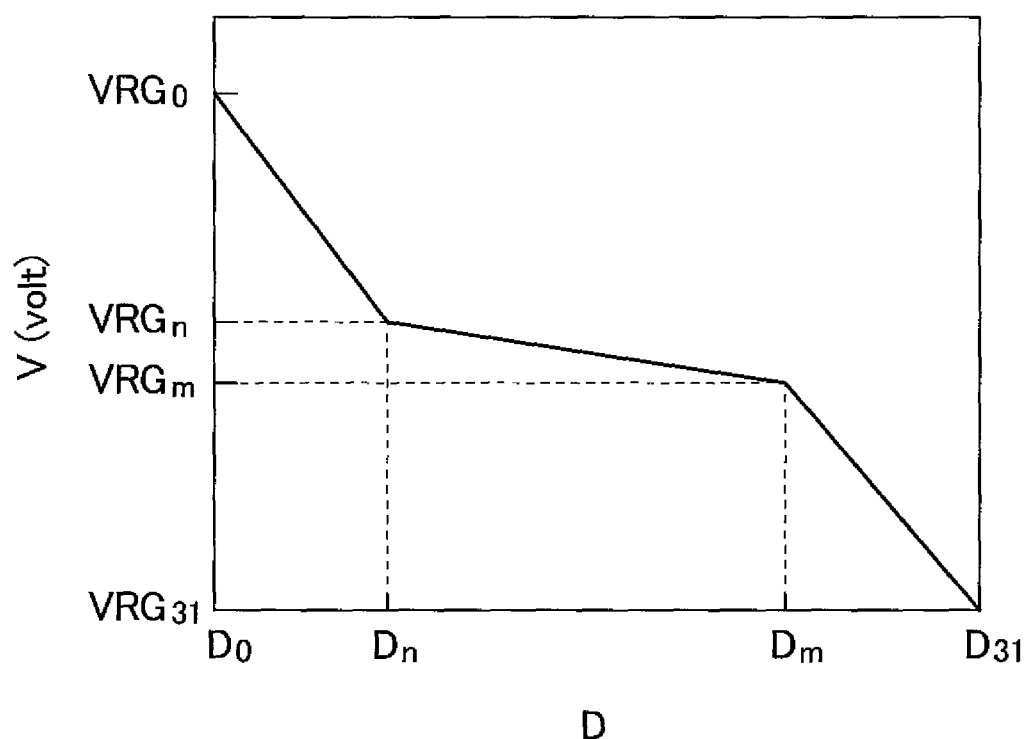
FIG. 8 is a schematic graph for explaining the principle of a gamma correction.

FIG. 8 is a schematic graph for explaining the principle of a gamma correction.

In FIG. 8, the abscissa axis represents a value D (the number of gray scales) of display data, while the ordinate axis represents a value V (volt) of a gray scale voltage. In FIG. 8, the value D of display data is set to 32 values of $D_0$ to $D_{31}$.

The value D of display data represents a gray scale. In the gamma correction, the rate of change (gradient) of the gray scale voltage V with respect to the display data D is adjusted to approximate the change of voltage with respect to a gray scale to the gamma function.

When the change is approximated to the gamma function, the value of the reference gray scale voltage $VRG_n$ corresponding to the display data $D_n$ is determined as shown in FIG. 8, for example, whereby the gradient of the gray scale voltage from the display data $D_0$ to the display data $D_n$ is determined. The gradient of the gray scale voltage is approximated to the gamma function, whereby the gray scale voltages generated by dividing the reference gray scale voltages $VRG_0$ to $VRG_n$ can be approximated to the gamma function.

Similarly, the value of the reference gray scale voltage $VRG_n$ of the display data $D_n$ and the value of the reference gray scale voltage $VRG_m$ of the display data $D_m$ are determined, whereby the gradient of the gray scale voltage from the display data D to the display data $D_m$ is determined and approximated to the gamma function. The value of the reference gray scale voltage $VRG_m$ of the display data $D_m$ and the value of the reference gray scale voltage $VRG_{31}$ of the display data $D_{31}$ are determined, whereby the gradient of the gray scale voltage of the display data $D_m$ to the display data $D_{31}$ is determined and approximated to the gamma function.

Figure 9A:
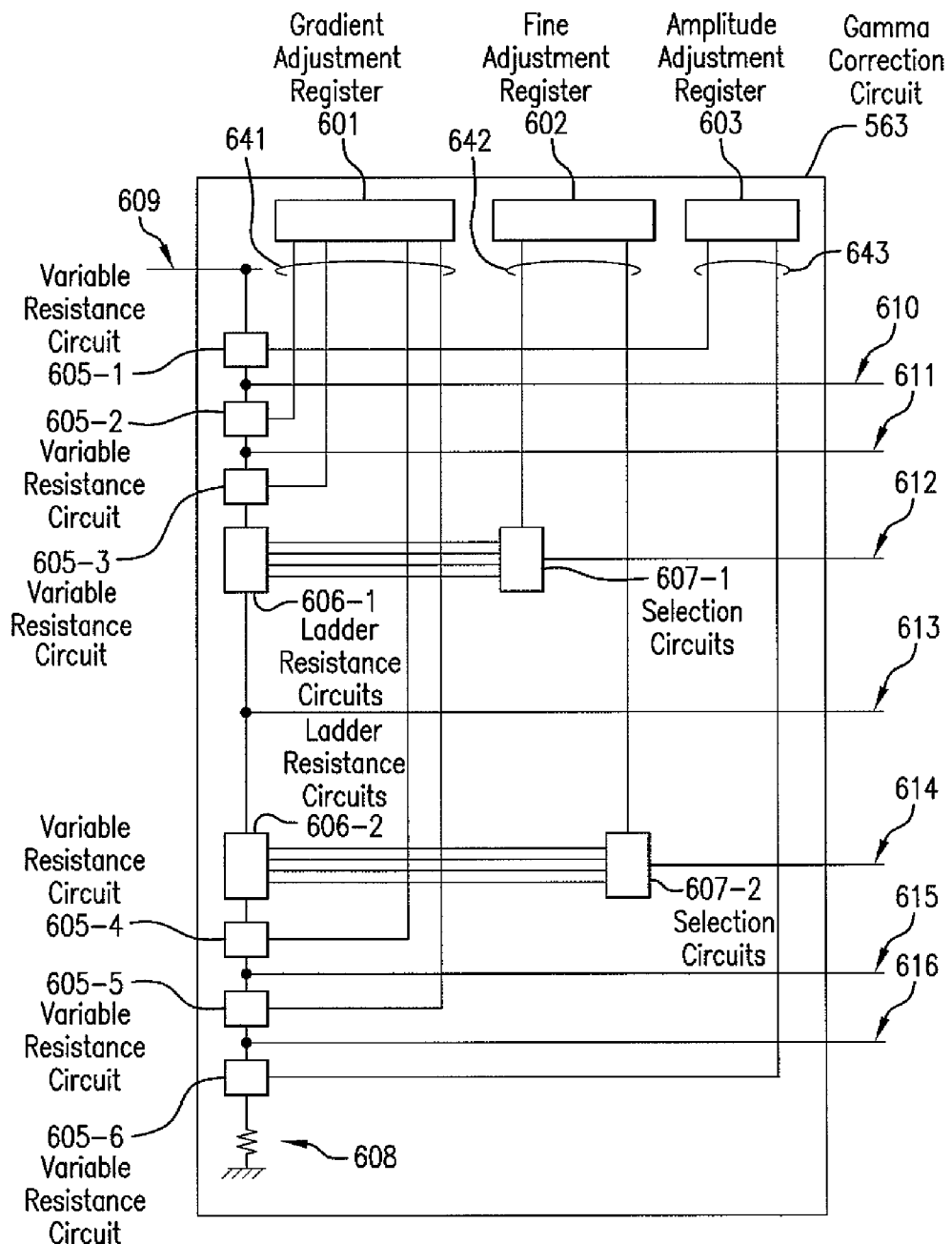
FIG. 9A is a schematic block diagram showing an exemplary schematic configuration of a gamma correction circuit.
Figure 9B:
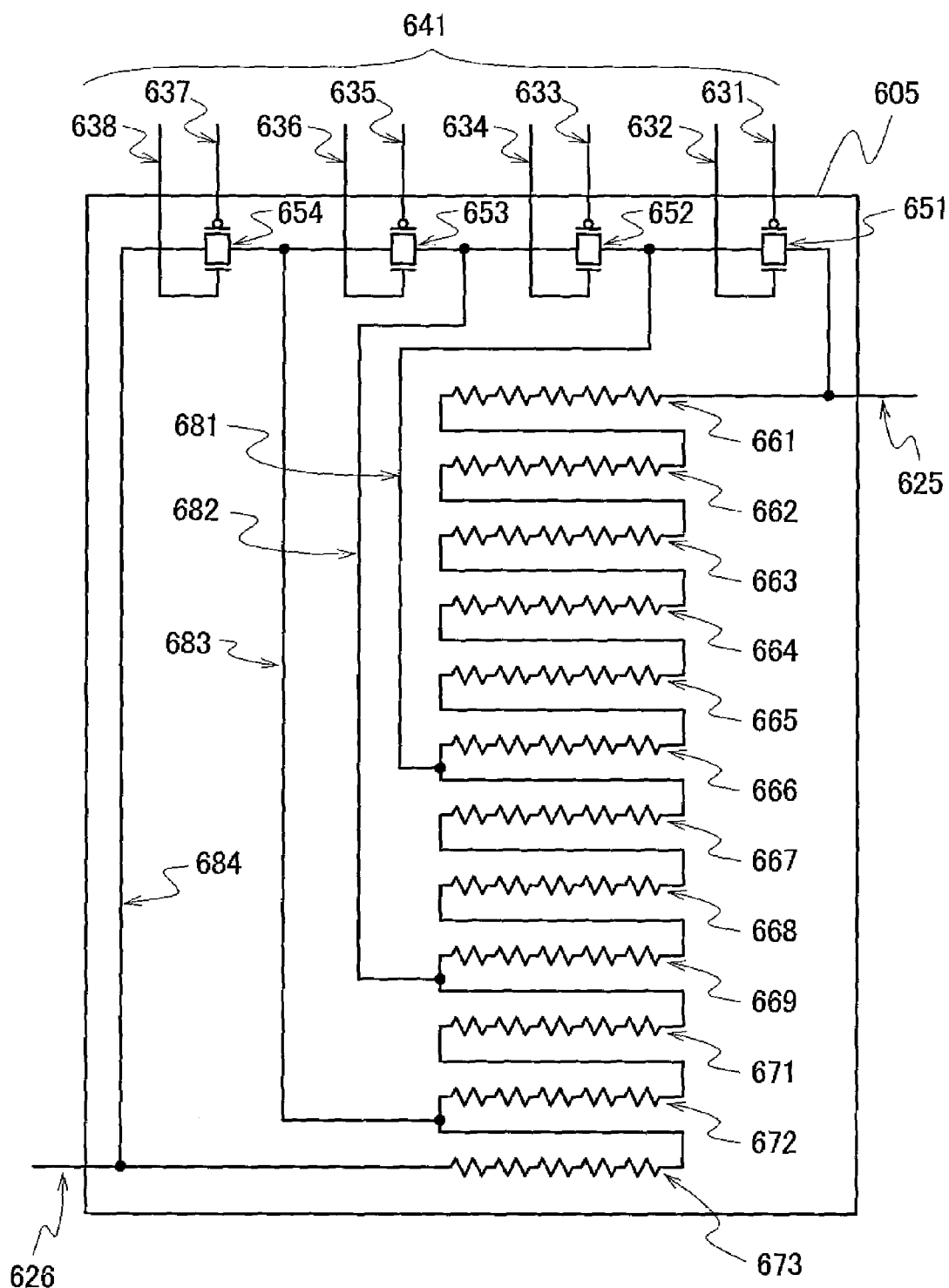
FIG. 9B is a schematic circuit diagram showing an exemplary schematic configuration of a variable resistance circuit in FIG. 9A.
Figure 9C:
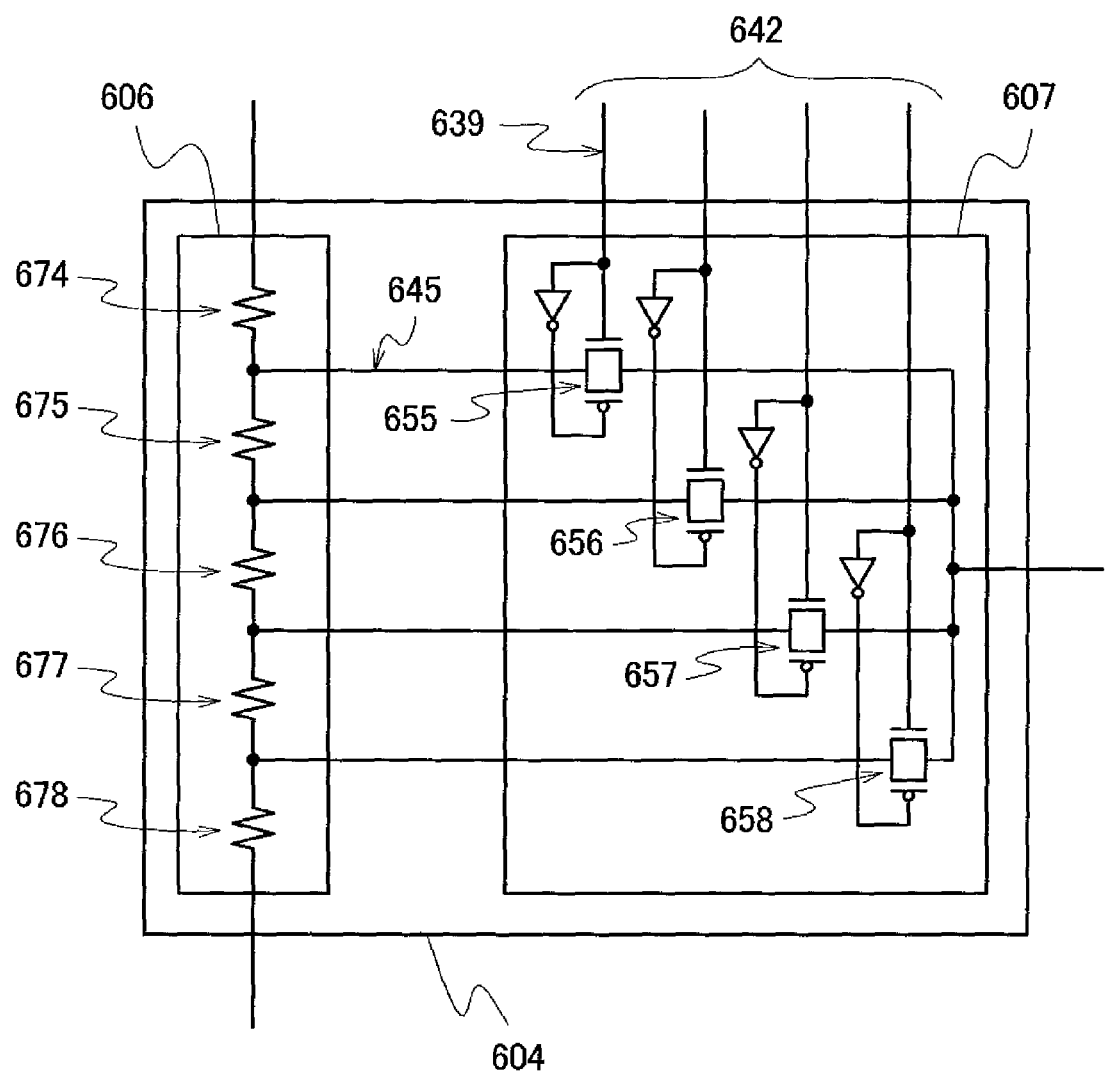
FIG. 9C is a schematic circuit diagram showing an exemplary schematic configuration of a ladder resistance circuit in FIG. 9A.

FIGS. 9A to 9C are schematic views showing an exemplary schematic configuration of the gamma correction circuit. FIG. 9A is a schematic block diagram showing an exemplary schematic configuration of the gamma correction circuit. FIG. 9B is a schematic circuit diagram showing an exemplary schematic configuration of a variable resistance circuit in FIG. 9A. FIG. 9C is a schematic circuit diagram showing an exemplary schematic configuration of a ladder resistance circuit in FIG. 9A.

The gamma correction circuit 563 which outputs the reference gray scale voltage approximated to the gamma function has a gradient adjustment register 601, a fine adjustment register 602, and an amplitude adjustment register 603 as shown in FIG. 9A, for example. The first drive circuit component 5-1 can output the reference gray scale voltages VRG approximated to the gamma function in accordance with values set in the respective registers.

The gray scale reference voltage VDH is supplied as a reference voltage to the gamma correction circuit 563 via a wiring 609. The gray scale reference voltage VDH is divided through the variable resistance circuits 605 and ladder resistance circuits 606 connected in series with one another. The divided voltages are each supplied as a reference gray scale voltage VRG to reference gray scale voltage wirings 610 to 616. Therefore, the voltage value divided by using the variable resistance circuits 605 and the ladder resistance circuits 606 is adjusted, so that the reference gray scale voltage VRG can be adjusted.

The variable resistance circuit 605 is configured as shown in FIG. 9B, for example, and its resistance value can be changed in accordance with the values set in the gradient adjustment register 601 and the amplitude adjustment register 603.

The variable resistance circuit 605 changes the resistance value between an input terminal 625 and an output terminal 626 in response to control signals 641 from the outside. Resistances 661 to 673 are connected in series between the input terminal 625 and the output terminal 626. Analog switches 651, 652, 653, and 654 are connected in parallel with the resistances connected in series.

The input terminal 625 is connected to the resistance 661 and the analog switch 651. The other terminal of the analog switch 651 is connected to the resistance 666 via a wiring 681. Further, resistances of resistances 661, 662, 663, 664, 665, and 666 are connected in series with one another, in which the input terminals and output terminals of the resistances connected in series through the analog switch 651 can be short-circuited. When a control signal line 631 is at a low voltage level, and a control signal line 632 is at a high voltage level, the input terminals and output terminals of the resistances 661, 662, 663, 664, 665, and 666 are short-circuited through the analog switch 651. Therefore, there is no resistance value apparently between the input terminal 625 and the output terminal 626.

Similarly, the analog switch 652 is brought into the ON state through control signal lines 633 and 634, so that the input terminals and output terminals of the resistances 667, 668, and 669 can be short-circuited. The analog switch 653 is brought into the ON state through control signal lines 635 and 636, so that the input terminals and output terminals of the resistances 671 and 672 can be short-circuited. The analog switch 654 is brought into the ON state through control signal lines 637 and 638, so that the input terminal and output terminal of the resistance 673 can be short-circuited.

In this case, for example, when the analog switch 651 is brought into the ON state, the state where the 12 resistances are connected in series with one another between the input terminal 625 and the output terminal 626 can be changed into the state where six of the resistances are connected in series with one another. Therefore, the resistance value between the input terminal 625 and the output terminal 626 can be changed.

As described above, the variable resistance circuits 605 are connected in series with one another in the gamma correction circuit 563 shown in FIG. 9A. In the gamma correction circuit 563, the variable resistance circuits 605 and the ladder resistance circuits 606 are connected in series with one another to form a distribution circuit. The resistance value is changed by the variable resistance circuit 605, so that a reference gray scale voltage to be output to a reference gray scale voltage wiring can be adjusted.

In this case, the ladder resistance circuit 606 is configured as shown in FIG. 9C, for example. Voltage can be extracted from a contact of the ladder resistance circuit 606 in accordance with the value set in the fine adjustment register and through a selection circuit 607.

The ladder resistance circuit 606 and the selection circuit 607 form a variable dividing circuit 604. In the ladder resistance circuit 606, resistances 674 to 678 are connected in series with one another, and a wiring 645 is input from the contact of each of the resistances to the selection circuit 607. Control signal lines 642 are input to the selection circuit and connected to the control terminals of analog switches to 658.

For example, when a high voltage is transmitted to control signal line 639, the analog switch 655 is brought into the ON state to output the voltage generated at the contact of the resistances 674 and 675. When the ladder resistance circuit and the selection circuit 607 are used, a voltage generated at each contact of the ladder resistance circuit 606 can be selected and extracted.

The output of the gamma correction circuit 563 can be finely adjusted by selecting the voltage divided in the variable dividing circuit 604, for example. The fine adjustment register controls selection circuits 607-1 and 607-2 through the control signals 642 to adjust the gradient of the display data $D_m$ to $D_n$.

Figure 10:
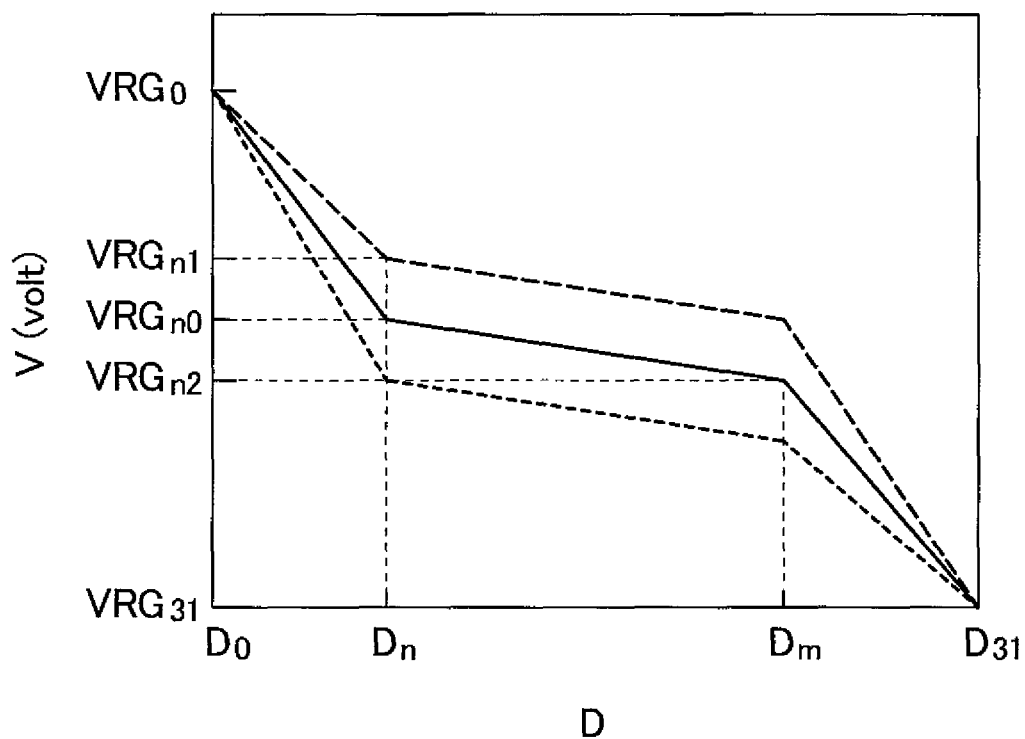
FIG. 10 is a schematic view for explaining a method for adjusting the gradient of a reference gray scale voltage in the gamma correction circuit.

FIG. 10 is a schematic view for explaining a method for adjusting the gradient of a reference gray scale voltage in the gamma correction circuit.

In the gamma correction circuit 563 configured as shown in FIGS. 9A to 9C, the gradient adjustment register 601 can be used to adjust the gradient of the reference gray scale voltage VRG. As the method for adjusting the gradient of the reference gray scale voltage VRG in the gamma correction circuit 563, the gradient from the reference gray scale voltage $VRG_0$ to the reference gray scale voltage $VRG_n$ which is a first change point will be first described.

The gamma correction circuit 563 shown in FIG. 9A outputs the reference gray scale voltage $VRG_0$ from the reference gray scale voltage wiring 610; the gray scale voltage $VRG_3$ from the reference gray scale voltage wiring 611; the gray scale voltage $VRG_7$ from the reference gray scale voltage wiring 612; the gray scale voltage $VRG_{15}$ from the reference gray scale voltage wiring 613; the gray scale voltage $VRG_{22}$ from the reference gray scale voltage wiring 614; the gray scale voltage $VRG_{27}$ from the reference gray scale voltage wiring 615; and the gray scale voltage $VRG_{31}$ from the reference gray scale voltage wiring 616.

In this case, for example, the gamma correction circuit 563 changes the resistance value of a variable resistance circuit 605-2 connected between the reference gray scale voltage wiring 610 and the reference gray scale voltage wiring 611 with the gradient adjustment register 601, so that the voltage value output from the reference gray scale voltage wiring 611 is adjusted.

In the case where the resistance value of the variable resistance circuit 605-2 is decreased, the voltage output from the reference gray scale voltage wiring 611 is shifted to the side of the voltage $VRG_0$ because the amount of voltage drop is decreased. Therefore, in the case where a gradient changing point is defined as any display data $D_n$, the reference gray scale voltage changes from $VRG_{n-0}$ to $VRG_{n-1}$ as shown in FIG. 10. Similarly, in the case where the resistance value of the variable resistance circuit 605-2 is increased, the reference gray scale voltage changes from $VRG_{n-0}$ to $VRG_{n-2}$.

Similarly, the value of a variable resistance circuit 605-3 is adjusted, so that the gray scale voltage $VRG_7$ output from the reference gray scale voltage wiring 612 can be adjusted.

In this case, also the gradient from the reference gray scale voltage $VRG_{31}$ to the reference gray scale voltage $VRG_m$ which is a second change point can be adjusted by changing the resistance values of a variable resistance circuit 605-4 and a variable resistance circuit 605-5.

Next, amplitude adjustment will be described. The amplitude adjustment register 603 can control variable resistance circuits 605-1 and 605-6 to adjust the potential difference between the reference gray scale voltage wirings 610 and 616.

The reference gray scale voltage $VRG_0$ is output from the reference gray scale voltage wiring 610. The resistance value of the variable resistance circuit 605-1 is changed, so that the reference gray scale voltage $VRG_0$ can be increased/decreased.

Similarly, the reference gray scale voltage $VRG_{31}$ is output from the reference gray scale voltage wiring 616. The resistance value of the variable resistance circuit 605-6 is changed, so that the reference gray scale voltage $VRG_{31}$ can be increased/decreased.

Next, the gray scale reference voltage VDH supplied to the gamma correction circuit 563 via the wiring 609 will be described. The gray scale reference voltage VDH is output from the reference gray scale voltage circuit 182 based on the reference voltage Vref output from the reference voltage generating circuit 185 shown in FIG. 4A.

Figure 11:
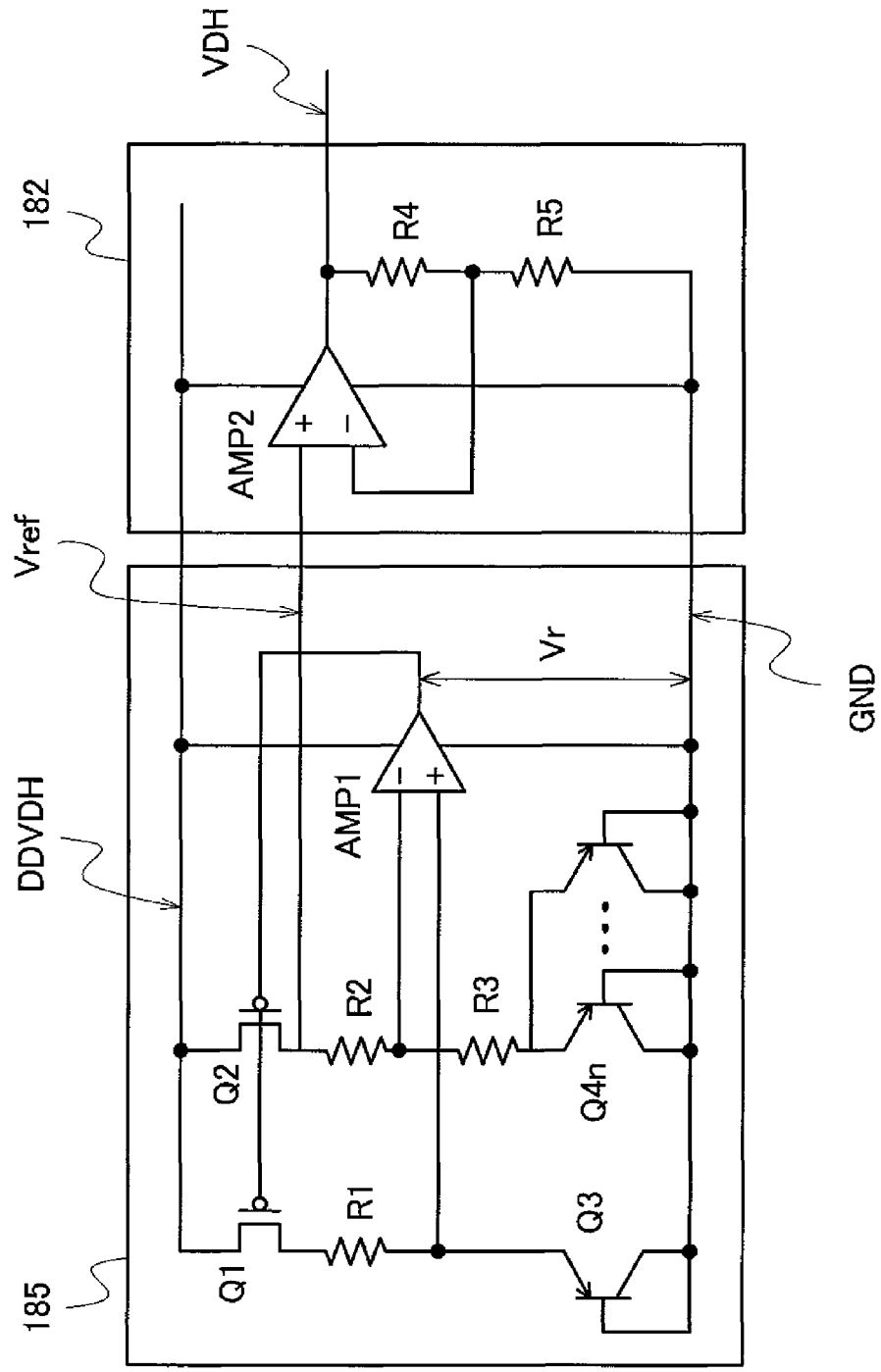
FIG. 11 is a schematic circuit diagram showing exemplary schematic configurations of a reference voltage generating circuit and a reference gray scale voltage circuit.

FIG. 11 is a schematic circuit diagram showing exemplary schematic configurations of the reference voltage generating circuit and the reference gray scale voltage circuit.

The reference voltage generating circuit 185 in the first drive circuit component 5-1 forms a band-gap circuit as shown in FIG. 11, for example. The reference gray scale voltage circuit 182 forms an amplifier for current-amplifying the output voltage of the reference voltage generating circuit 185.

The reference voltage generating circuit 185 has p-channel MOS transistors Q1 and Q2, resistances R1, R2, and R3, a diode-connected bipolar transistor Q3, n parallel diode-connected bipolar transistors Q4n, and an operational amplifier circuit AMP1.

The transistor Q4n includes a plurality of transistors which have the same layout pattern as that of the transistor Q3, are arranged in an array, and are connected in parallel with one another. A voltage at the connection between the resistances R2 and R3 is applied to the inverting input terminal of the operational amplifier circuit AMP1, while a voltage at the connection between the resistance R1 and the diode-connected transistor Q3 is applied to the non-inverting input terminal thereof. The output of the operational amplifier circuit AMP1 is input to the control terminals of the p-channel MOS transistors Q1 and Q2.

Here, an output voltage Vr of the operational amplifier circuit AMP1 can be expressed by: Vr=KVt+Vbe3, where Vbe3 is the forward voltage of the pn junction between the base and emitter of the transistor Q3. In this case, K is a constant, a coefficient Vt has a positive gradient with respect to temperature, and the voltage Vbe3 has a negative gradient. Therefore, the output voltage Vr becomes a stable output without temperature dependence.

Since the output voltage Vr of the operational amplifier circuit AMP1 is input to the control terminals of the p-channel MOS transistors Q1 and Q2, the reference voltage generating circuit 185 operates so as to suppress the fluctuations caused by a power supply voltage VCORE or the like to stabilize the output voltage Vref.

However, the reference gray scale voltage circuit 182 is an amplifier circuit which amplifies the input voltage Vref by the ratio of the resistances R4 to R5: (R4+R5)/R5 and outputs the resultant voltage. Therefore, the fluctuations of the output voltage VDH (gray scale reference voltage) is (R4+R5)/R5 times larger than that of the input voltage Vref.

Figure 12:
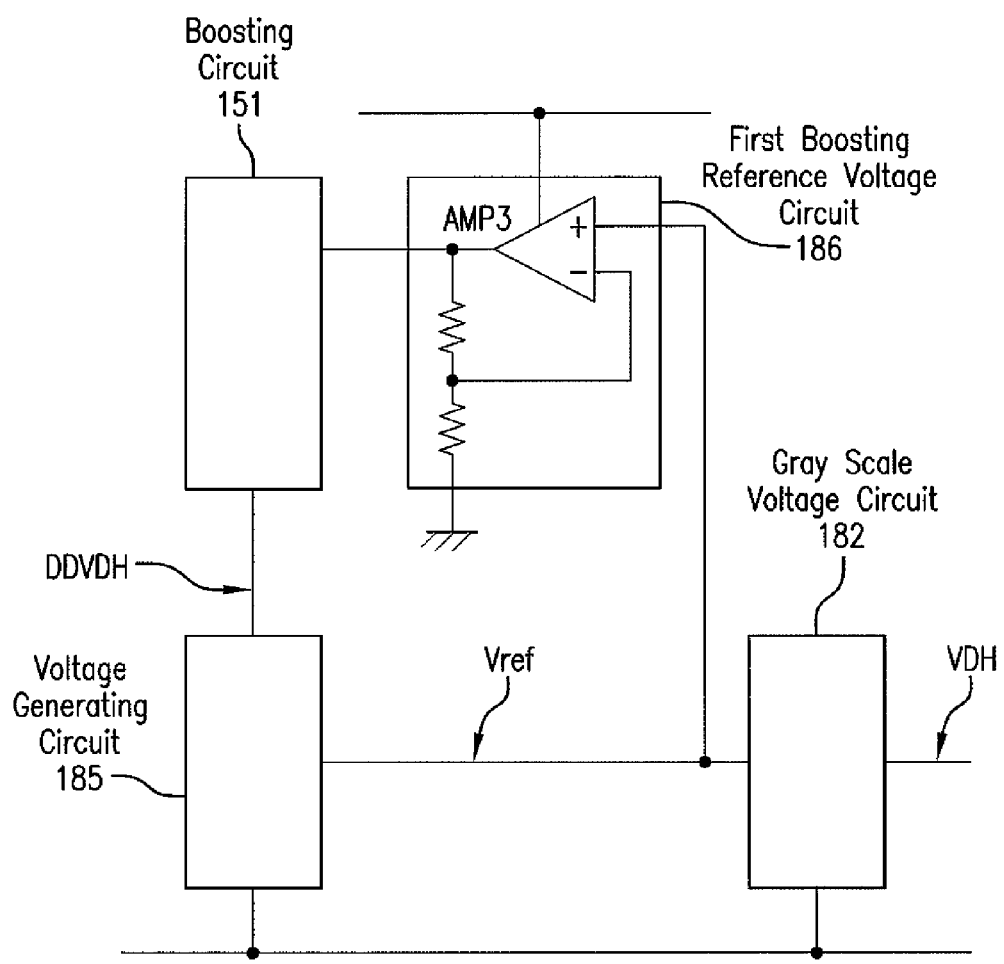
FIG. 12 is a schematic block diagram showing a schematic configuration of the connection between the reference voltage generating circuit and a boosting circuit.

FIG. 12 is a schematic block diagram showing a schematic configuration of the connection between the reference voltage generating circuit and the boosting circuit.

In the first drive circuit component 5-1, the reference voltage generating circuit 185 and the boosting circuit 151 are connected to each other as shown in FIG. 12, for example.

The boosting circuit 151, which is the boosting circuit shown in FIG. 4A, outputs the power supply voltage DDVDH. The power supply voltage DDVDH is used as a power supply voltage of the reference voltage generating circuit 185 to stabilize the reference voltage generating circuit 185. Reference numeral 186 denotes the first boosting reference voltage circuit, which amplifies the output voltage Vref of the reference voltage generating circuit 185 so that the voltage can be used in the boosting circuit 151.

Next, a case will be described in which the output voltage Vref of the reference voltage generating circuit 185 is used as a bias voltage of the output circuit 556 shown in FIG. 2.

Figure 13A:
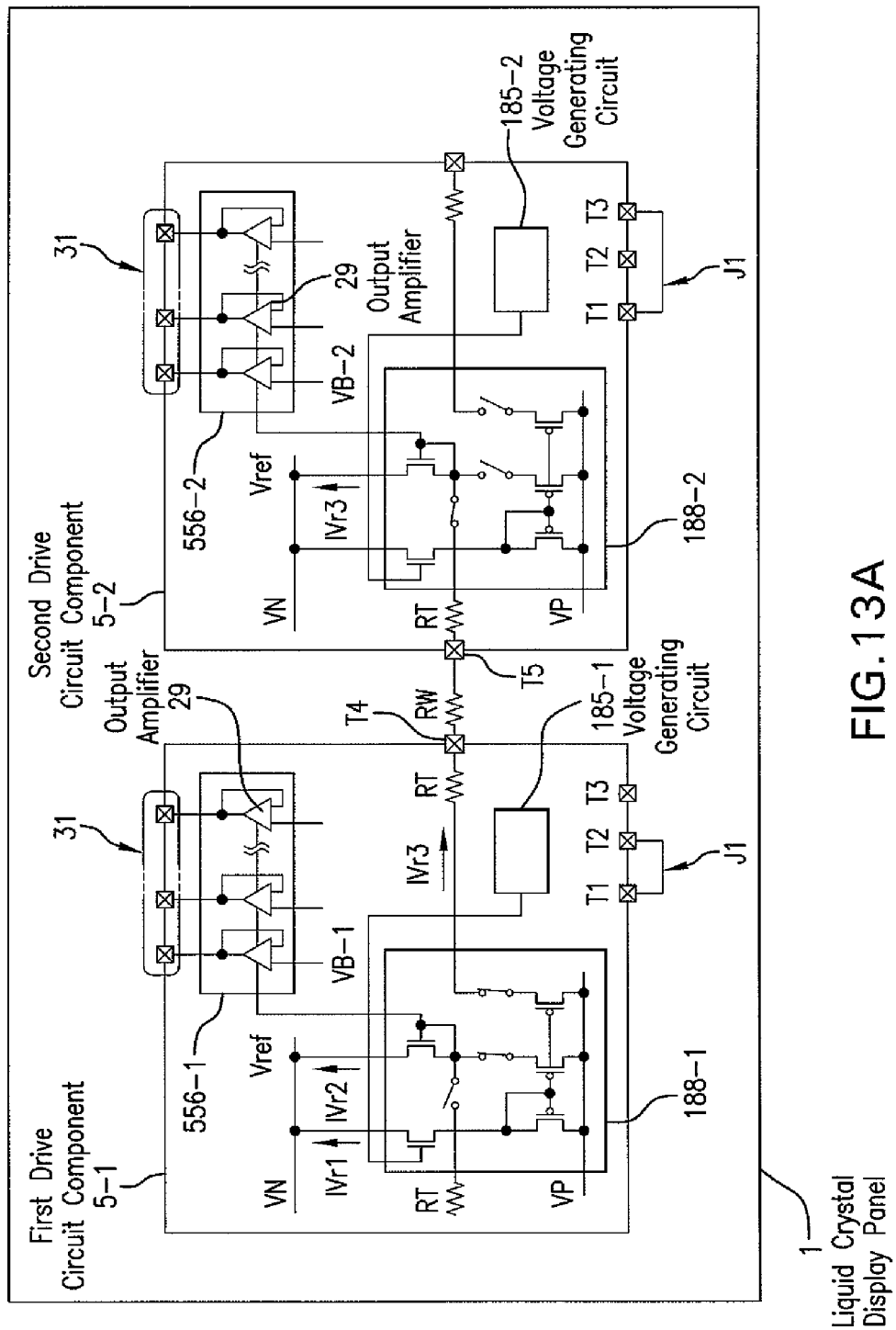
FIG. 13A is a schematic circuit diagram showing an exemplary schematic configuration of two drive circuit components mounted on the liquid crystal display panel of the embodiment.
Figure 13B:
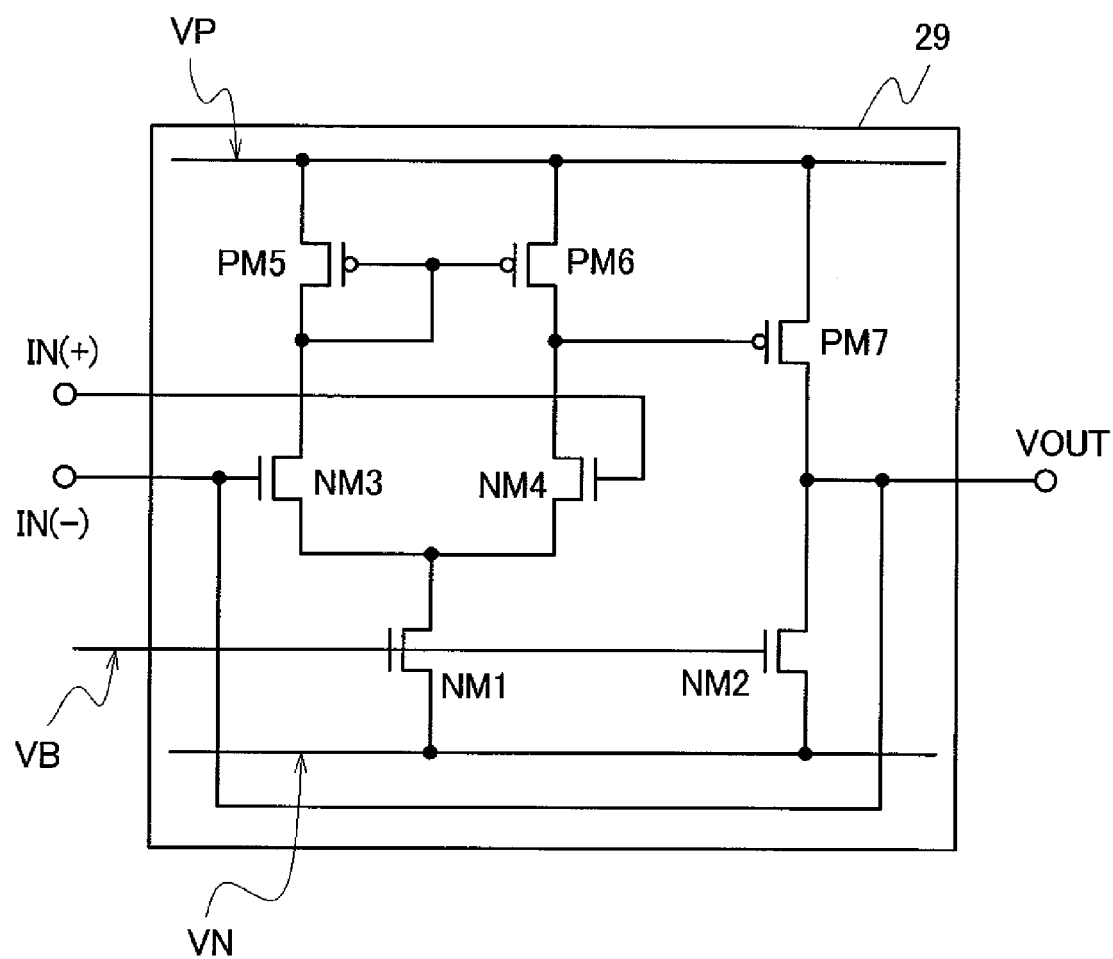
FIG. 13B is a schematic circuit diagram showing an exemplary schematic configuration of an output amplifier.
Figure 13C:
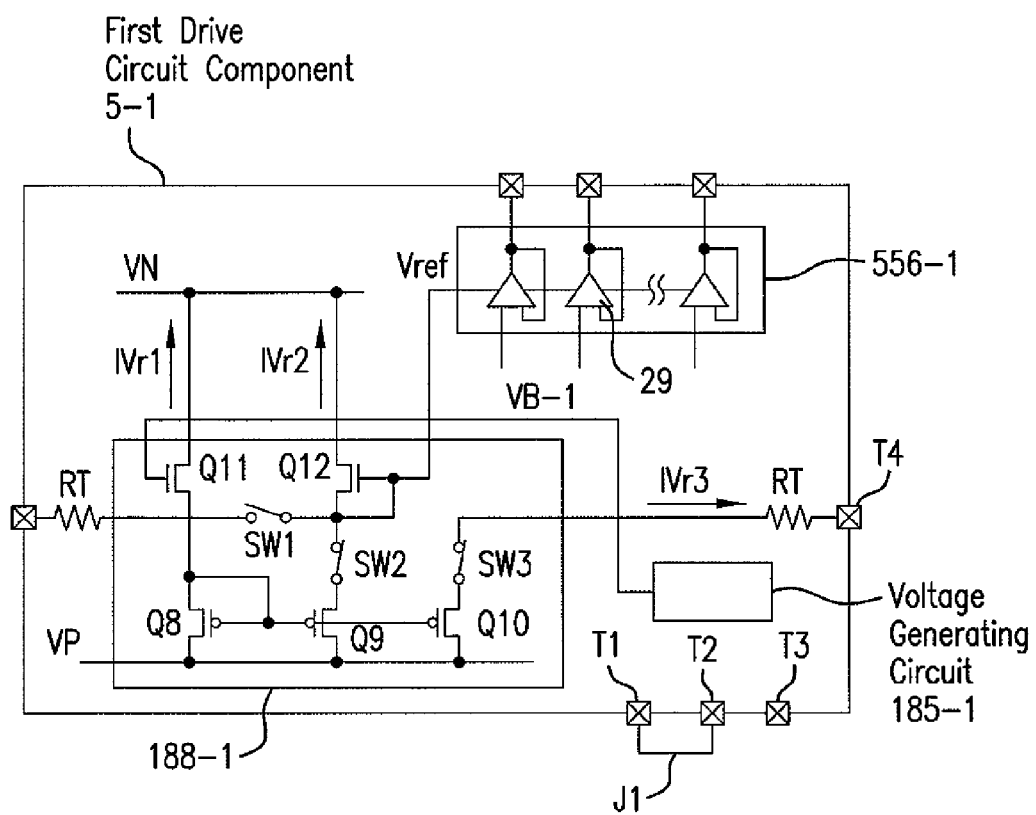
FIG. 13C is a schematic circuit diagram showing a schematic configuration of the first drive circuit component in FIG. 13A in an enlarged fashion.
Figure 13D:
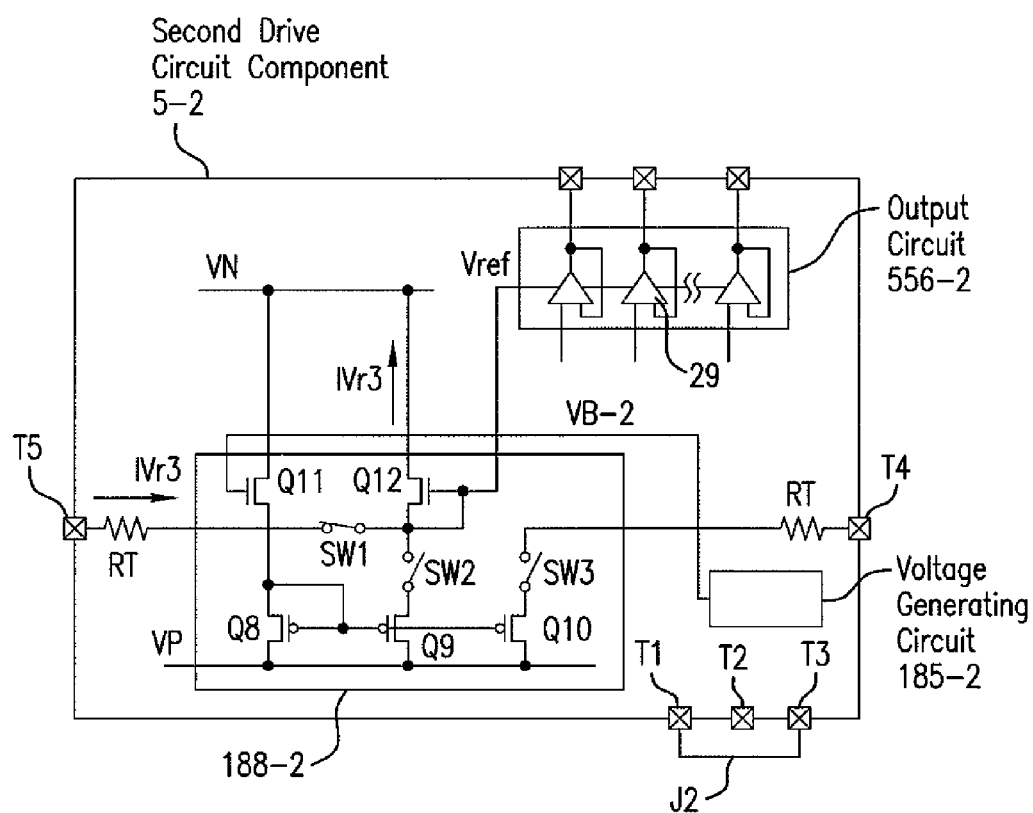
FIG. 13D is a schematic circuit diagram showing a schematic configuration of a second drive circuit component in FIG. 13A in an enlarged fashion.

FIGS. 13A to 13D are schematic views showing an exemplary schematic configuration of two drive circuit components mounted on the liquid crystal display panel of the embodiment. FIG. 13A is a schematic circuit diagram showing the exemplary schematic configuration of the two drive circuit components mounted on the liquid crystal display panel of the embodiment. FIG. 13B is a schematic circuit diagram showing an exemplary schematic configuration of an output amplifier. FIG. 13C is a schematic circuit diagram showing a schematic configuration of the first drive circuit component in FIG. 13A in an enlarged fashion. FIG. 13D is a schematic circuit diagram showing a schematic configuration of the second drive circuit component in FIG. 13A in an enlarged fashion.

In the liquid crystal display device of the embodiment, the first drive circuit component 5-1 and the second drive circuit component 5-2 have the same configuration. Therefore, the above-described reference voltage generating circuit 185 is provided in each of the first drive circuit component 5-1 and the second drive circuit component 5-2 as shown in FIG. 13A, for example. In this case, the voltage Vref output from the reference voltage generating circuit 185 is input to a bias circuit 188 where a bias voltage VB is generated from the reference voltage Vref to be output.

The bias voltage VB is used as a reference voltage of the output amplifier 29. The output amplifier 29 is a well-known voltage follower circuit in which an output terminal VOUT and an inverting input terminal (−) IN of a differential amplifier circuit which is composed of p-transistors (PM1 to PM7) and n-transistors (NM1 to NM7) are connected to each other as shown in FIG. 13B, for example.

In the output amplifier 29, the bias line VB is input to the control terminals of the transistors (NM1 and NM2) constituting a constant current source. The reference voltage Vref is applied to the bias line VB, so that the current flowing through the output amplifier 29 and the output thereof become constant.

Like a conventional liquid crystal display device, when in the first drive circuit component 5-1 and the second drive circuit component 5-2 mounted on the liquid crystal display panel 1, the reference voltages Vref generated by the respective reference voltage generating circuits 185 of the components are used, there arises a problem that the bias voltage in the first drive circuit component 5-1 and the bias voltage in the second drive circuit component 5-2 are different from each other because of, for example, manufacturing variations of the drive circuits or the like.

Therefore, in the liquid crystal display device of the embodiment, a bias voltage for both the first drive circuit component 5-1 and the second drive circuit component 5-2 is generated with the reference voltage Vref output from a reference voltage generating circuit 185-1 of the first drive circuit component 5-1, as shown in FIG. 13A.

A bias circuit 188-1 in the first drive circuit component 5-1 is configured as shown in FIG. 13C, for example. The reference voltage Vref output from the reference voltage generating circuit 185-1 is input to the control terminal of a transistor Q11 through which a current IVr1 steadily flows in a direction shown by an arrow.

The control terminals of transistors Q8, Q9, and Q10 are connected to the input terminal of the transistors Q11, and the current IVr1 and currents IVr2 and IVr3 flowing through the transistors Q8, Q9, and Q10 have the same value.

In the bias circuit 188-1 of the first drive circuit component 5-1, a switch SW1 is turned OFF, and a switch SW2 is turned ON to flow the current IVr2 into a transistor Q12, so that a voltage generated at the control terminal is supplied to an output circuit 556-1 as a bias voltage VB-1.

In the bias circuit 188-1 of the first drive circuit component 5-1, a switch SW3 is turned ON to output the current IVr3 from a reference current output terminal T4, so that the current IVr3 is supplied to a reference current input terminal T5 of the second drive circuit component 5-2.

A bias circuit 188-2 of the second drive circuit component 5-2 is configured as shown in FIG. 13D, for example. That is, in the bias circuit 188-2 of the second drive circuit component 5-2, the switch SW1 is turned ON to flow the reference current IVr3 input from the first drive circuit component 5-1 into the transistor Q12, so that a voltage generated at the control terminal of the transistor Q12 is supplied to an output circuit 556-2 as a bias voltage VB-2.

In the second drive circuit component 5-2, even when a voltage drop occurs due to a wiring resistance RW, the current IVr3 equivalent to the current IVr1 is flowed in the transistor Q12, so that the bias voltage VB-2 equivalent to the bias voltage VB-1 can be provided. Accordingly, the magnitude of a current flowing into the output amplifier 29 of the second drive circuit component 5-2 can be the same as that of a current flowing into the output amplifier 29 of the first drive circuit component 5-1, so that the second drive circuit component 5-2 can have the same driving ability as the first drive circuit component 5-1. In FIGS. 13A, 13C, and 13D, reference numeral RT denotes a protective resistance of each terminal.

In the first drive circuit component 5-1 and the second drive circuit component 5-2, master/slave selection terminals T1, T2, and T3 are provided to control whether the first drive circuit component 5-1 and the second drive circuit component 5-2 are in a master state or a slave state through jumper wires J1 and J2, for example. For example, the terminal T2 is set at a ground potential (GND), and the terminal T3 is set at a positive power supply voltage. The master/slave selection terminals T1, T2, and T3 are connected to a not-shown master/slave selecting circuit. The master/slave selecting circuit is a circuit which switches the switches SW1, SW2, and SW3 of the bias circuit 188 between ON and OFF in accordance with, for example, the connecting pattern of the master/slave selection terminals T1, T2, and T3. In the example shown in FIG. 13A, the first drive circuit component 5-1 is in the master state, in which the current IVr3 output from the bias circuit based on the reference voltage Vref generated in the reference voltage generating circuit 185-1 of the first drive circuit component 5-1 is output to the second drive circuit component 5-2.

Figure 14:
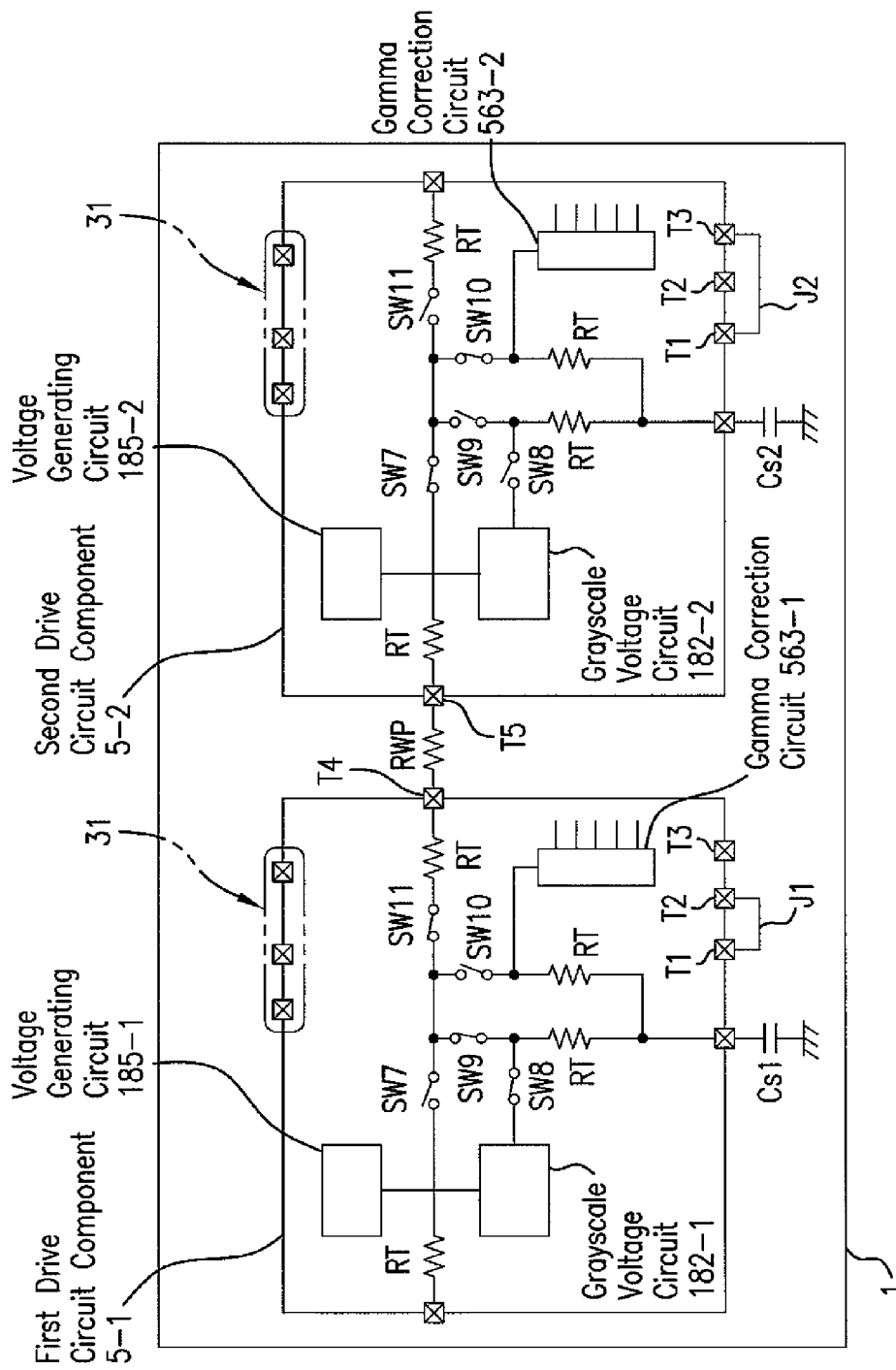
FIG. 14 is a schematic circuit diagram showing an exemplary schematic configuration of other portions of the two drive circuit components mounted on the liquid crystal display panel of the embodiment.

FIG. 14 is a schematic circuit diagram showing an exemplary schematic configuration of other portions of the two drive circuit components mounted on the liquid crystal display panel of the embodiment.

Each of the first drive circuit component 5-1 and the second drive circuit component 5-2 includes the reference voltage generating circuit 185 and the reference gray scale voltage circuit 182. As shown in FIG. 12, the reference gray scale voltage circuit 182 amplifies the output voltage Vref of the reference voltage generating circuit 185 and outputs the resultant voltage as the gray scale reference voltage VDH.

The gray scale reference voltage VDH output from the reference gray scale voltage circuit 182 is also used as a reference voltage of the above-described gamma correction circuit 563. Each of the first drive circuit component 5-1 and the second drive circuit component 5-2 includes the reference gray scale voltage circuit 182. However, in the case where two drive circuit components are mounted on the liquid crystal display panel 1, the gray scale reference voltage VDH generated in one of the drive circuit components (first drive circuit component 5-1) is used for both the drive circuit components as shown in FIG. 14, for example, to prevent the gray scale reference voltages VDH being different from each other due to manufacturing variations or the like.

In FIG. 14, the first drive circuit component 5-1 is set in the master state where the gray scale reference voltage VDH generated in the first drive circuit component 5-1 is supplied to the second drive circuit component 5-2. However, as shown in FIG. 14, when switches SW8, SW9, and SW11 are brought into the ON state, and switches SW7 and SW10 are brought into the OFF state to supply the gray scale reference voltage VDH from the first drive circuit component 5-1 to the second drive circuit component 5-2, a voltage sag occurs due to the terminal protective resistance RT and the wiring resistance RWP.

Especially as for the wiring resistance RWP on the liquid crystal display panel 1, since the resistance value is large compared with that of wiring on the circuit board (printed circuit board 70), and the variations are also large, it is not suitable as the wiring for supplying the gray scale reference voltage VDH.

Figure 15:
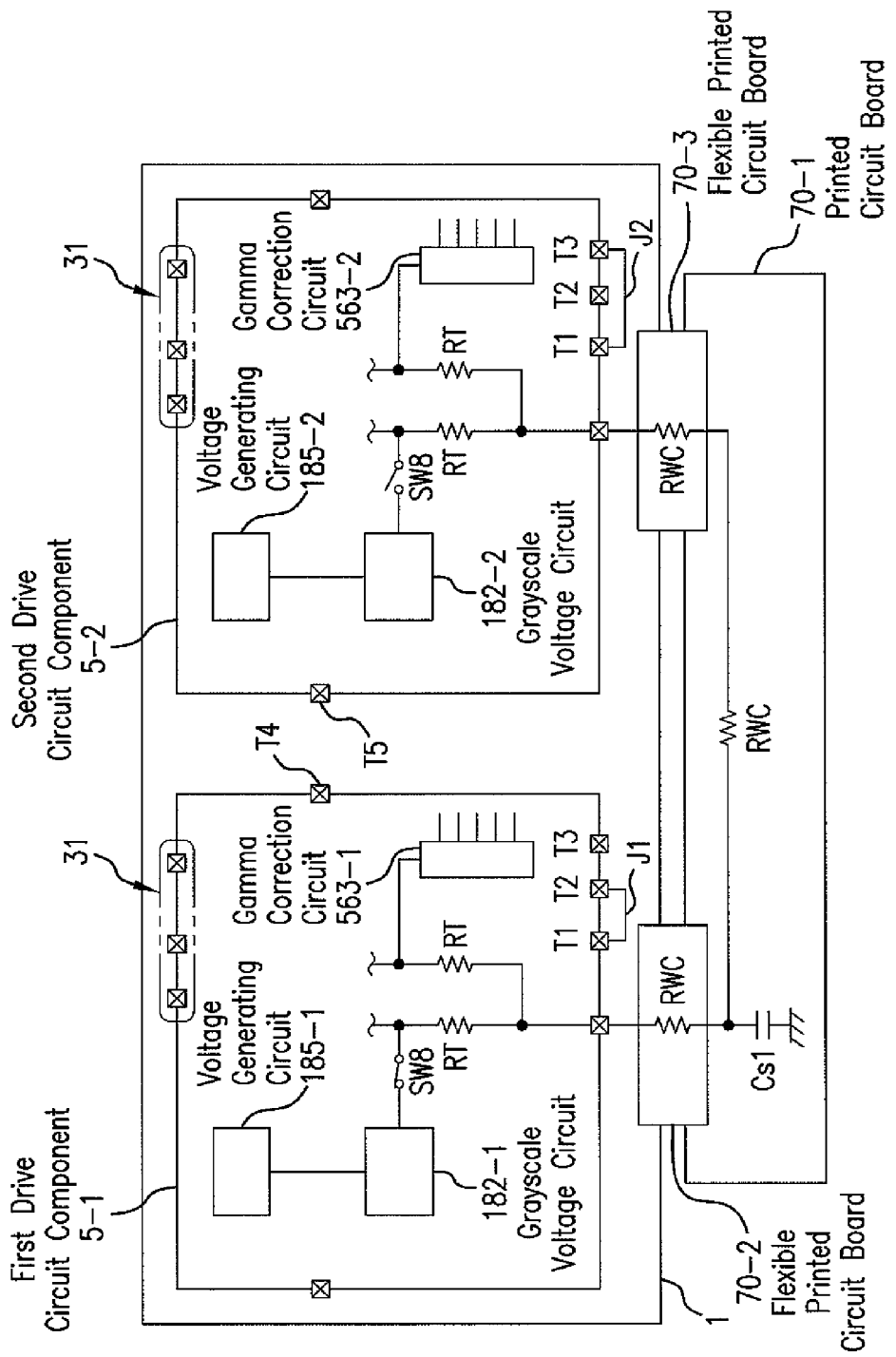
FIG. 15 is a schematic circuit diagram showing a preferable exemplary method for supplying a gray scale reference voltage.

FIG. 15 is a schematic circuit diagram showing a preferable exemplary method for supplying the gray scale reference voltage.

As described above, as a method for solving the problem of voltage drop occurred when the terminal of the first drive circuit component 5-1 and the terminal of the second drive circuit component 5-2 are connected to each other only with the wiring of the liquid crystal display panel 1 (TFT substrate 2), the present inventors have found a method in which the terminal of the first drive circuit component 5-1 and the terminal of the second drive circuit component 5-2 are connected to each other via the wiring of a printed circuit board 70-1 and the wirings of flexible printed circuit boards 70-2 and 70-3 to supply the gray scale reference voltage VDH as shown in FIG. 15, for example.

A resistance value RWC of each of the wirings of the printed circuit board 70-1 and the flexible printed circuit boards 70-2 and 70-3 is low compared with that of the wiring resistance RWP on the liquid crystal display panel 1, and the variations are also small. Therefore, the fluctuations of the gray scale reference voltage VDH can be suppressed to such an extent that the difference in driving ability between the two drive circuit components is negligible.

The gray scale reference voltage VDH can be supplied to the gamma correction circuit 563 through a stabilizing capacitor Cs1 provided on the printed circuit board 70-1. Therefore, the fluctuations of the gray scale reference voltage VDH can be further suppressed.

In the wiring path shown in FIG. 15, however, the wiring resistances RWP generated between the flexible printed circuit board 70-2 and the first drive circuit component 5-1, and between the flexible printed circuit board 70-3 and the second drive circuit component 5-2 are not taken into consideration for the wiring for supplying the gray scale reference voltage VDH to the second drive circuit component 5-2.

The wiring resistance RWP is a resistance value generated in the wirings and at the terminals formed on the liquid crystal display panel 1 and is a high resistance value compared with the wiring resistance RWC of the flexible printed circuit boards 70-2 and 70-3 or the printed circuit board 70-1, and the variations are also large.

Figure 16:
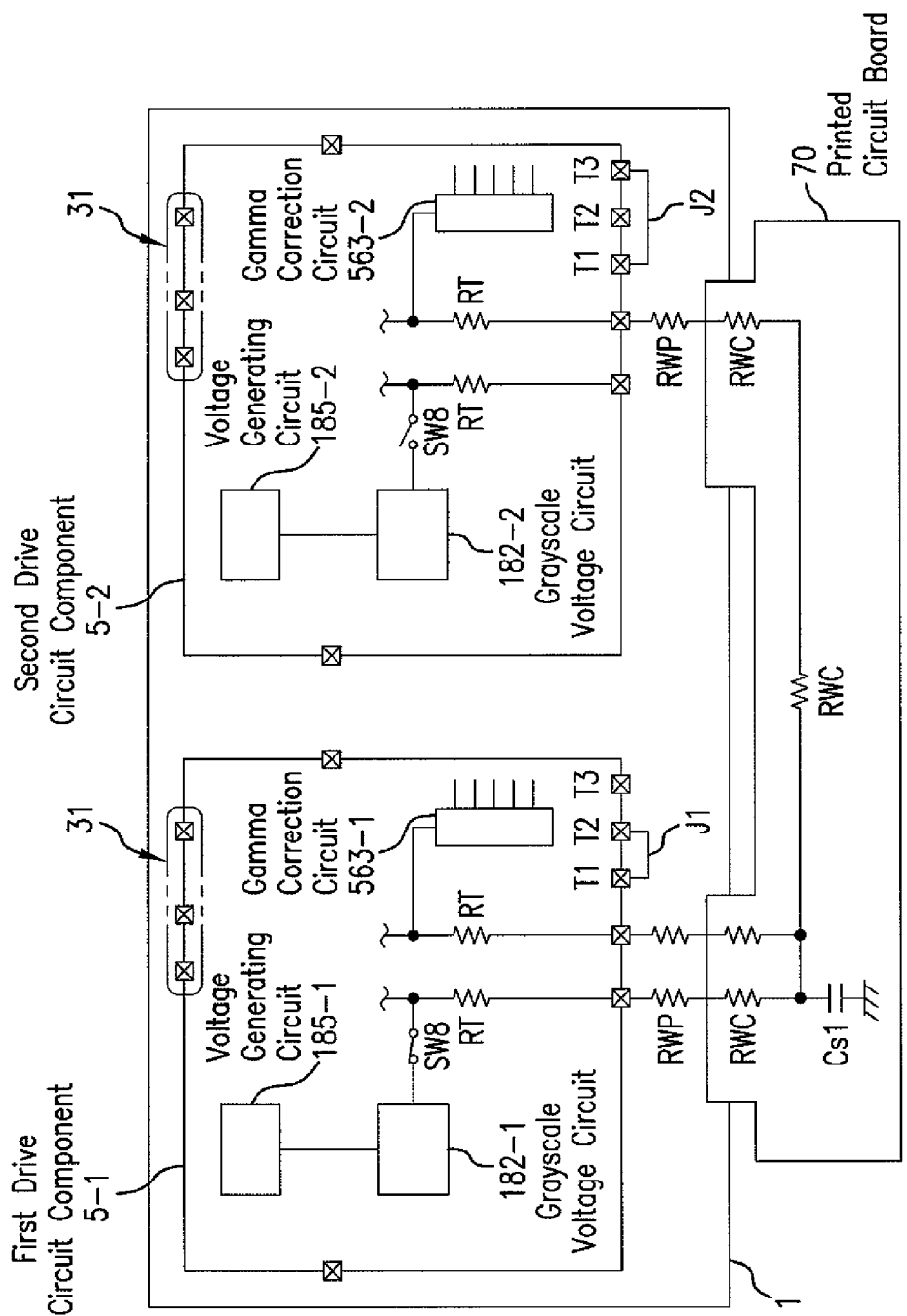
FIG. 16 is schematic circuit diagram showing a more preferable exemplary method for supplying a gray scale reference voltage.

FIG. 16 is a schematic circuit diagram showing a more preferable exemplary method for supplying the gray scale reference voltage.

As described above, as a method for solving the problem occurred when the terminal of the first drive circuit component 5-1 and the terminal of the second drive circuit component 5-2 are connected to each other via the wirings of the printed circuit board 70 to supply the gray scale reference voltage VDH, the present inventors have found a method in which the gray scale reference voltage VDH is once supplied also to the gamma correction circuit 563 of the first drive circuit component 5-1 via the printed circuit board 70 as shown in FIG. 16, for example. FIG. 16 shows the case of integrally providing the flexible printed circuit board 70 in the same manner as in FIG. 1, instead of the printed circuit board 70-1 and the flexible printed circuit boards 70-2 and 70-3 shown in FIG. 15. It is apparent that the flexible printed circuit boards 70-2 and 70-3 and the printed circuit board 70-1 may be provided separately as shown in FIG. 15.

In the wiring path shown in FIG. 16, although the gray scale reference voltage VDH is affected by the wiring resistances RWP, the first drive circuit component 5-1 and the second drive circuit component 5-2 each supply the gray scale reference voltage VDH to the gamma correction circuit 563 through the path with a similar wiring resistance value. Therefore, the fluctuations in the gray scale reference voltage VDH between the first drive circuit component 5-1 and the second drive circuit component 5-2 can be suppressed.

As described above, in the case where a plurality of drive circuit components are mounted on the liquid crystal display panel 1, a master function and a slave function are set, and the gray scale reference voltage VDH, the reference voltage Vref, and the like are supplied from a drive circuit component to which a master function is set to a drive circuit component to which a slave function is set. Therefore, the fluctuations in the supplied voltage between the drive circuit components can be suppressed.

The wiring path for supply is configured so as to suppress the fluctuations between the drive circuit components, so that the fluctuations in output signals between the drive circuit components can be suppressed to maintain a high display quality.

As described above, according to the liquid crystal display device of the embodiment, the degradation of display quality can be prevented when a plurality of drive circuit components are made to cooperate with each other to drive one display region.

Further, according to the liquid crystal display device of the embodiment, since components (IC chips) having the same configuration can be used as a plurality of drive circuit components, a reduction in productivity or increase in manufacturing cost of liquid crystal display devices can be prevented.

Although the invention has been specifically described so far based on the embodiment, the invention is not limited to the embodiment. It is apparent that the invention can be modified variously within a range not departing from the gist thereof.

For example, although the embodiment has described an example in which two drive circuit components are mounted on one liquid crystal display panel 1, the invention is not limited thereto but can be applied to the case where three or more drive circuit components are mounted on one liquid crystal display panel 1. In the case where three or more drive circuit components are mounted on one liquid crystal display panel 1, for example, one of the three or more drive circuit components is set as a master, and the gray scale reference voltage VDH, the reference voltage Vref, and the like generated in the drive circuit component may be supplied to the other drive circuit components.

Further, although the embodiment has described an example of a liquid crystal display device, the invention is not limited thereto. It is apparent that the invention can be applied to a display device having the same configuration and driving method of a liquid crystal display device (for example, light-emitting display device using organic electroluminescent).

What is claimed is:

1. A display device comprising:
   a display panel having a plurality of pixels arranged in a matrix, wherein the matrix includes a plurality of video signal data lines and a plurality of scanning signal lines, and wherein each of the pixels is coupled to one of the video signal data lines and one of the scanning signal lines;
   a printed circuit board connected to the display panel; and
   a first drive circuit and a second drive circuit mounted on the display panel or the printed circuit board, wherein the first drive circuit is connected to a first group of the video signal data lines to provide video signals to a first group of the pixels via the first group of video signal data data lines, and wherein the second drive circuit is connected to a second group of the video signal lines, different from the first group of video signal data lines, to provide video signals to a second group of the pixels via the second group of video signal data lines,
   each of the first drive circuit and the second drive circuit including
      a gray scale voltage generating circuit generating a gray scale voltage based on a gray scale reference voltage and
      a reference gray scale voltage circuit generating the gray scale reference voltage, wherein
   the gray scale voltage generating circuit of the second drive circuit is connected to the reference gray scale voltage circuit of the first drive circuit, and
   each of the gray scale voltage generating circuit of the first drive circuit and the gray scale voltage generating circuit of the second drive circuit are configured to generate the gray scale voltage based on the gray scale reference voltage generated in the reference gray scale voltage circuit of the first drive circuit rather than based on the gray scale reference voltage generated in the reference gray scale voltage circuit of the second drive circuit.

2. A display device according to claim 1, wherein
   the first drive circuit and the second drive circuit each operate
   in a master mode where the reference gray scale voltage circuit provided in the drive circuit is used or
   in a slave mode where a gray scale reference voltage output from the other drive circuit is input, and
   the master mode or the slave mode is selected in accordance with the connecting pattern of external terminals of the drive circuit.

3. A display device according to claim 1, wherein
   the reference gray scale voltage circuit of the first drive circuit and the gray scale voltage generating circuit of the second drive circuit are connected to each other via a wiring of the display panel and a wiring of the printed circuit board.

4. A display device according to claim 1, wherein
   the reference gray scale voltage circuit of the first drive circuit and the gray scale voltage generating circuit of the first drive circuit are connected to each other via a wiring of the display panel and a wiring of the printed circuit board, and
   the reference gray scale voltage circuit of the first drive circuit and the gray scale voltage generating circuit of the second drive circuit are connected to each other via the wiring of the display panel and the wiring of the printed circuit board.

5. A display device according to claim 1, wherein
   the display panel is a liquid crystal display panel having a liquid crystal composition sealed between a pair of substrates.

6. A display device comprising:
   a display panel having a plurality of pixels arranged in a matrix, wherein the matrix includes a plurality of video signal data lines and a plurality of scanning signal lines, and wherein each of the pixels is coupled to one of the video signal data lines and one of the scanning signal lines,
      the plurality of pixels each having a pixel electrode;
   a printed circuit board connected to the display panel; and
   a first drive circuit and a second drive circuit mounted on the display panel or the printed circuit board, wherein the first drive circuit is connected to a first group of the video signal data lines to provide video signals to a first group of the pixels via the first group of video signal data lines, and wherein the second drive circuit is connected to a second group of the video signal data lines, different from the first group of video signal data lines, to provide video signals to a second group of the pixels via the second group of video signal data lines, each of the first drive circuit and the second drive circuit including a gray scale voltage generating circuit generating a gray scale voltage to be applied to the pixel electrode based on a gray scale reference voltage, an output amplifier supplying the gray scale voltage generated in the gray scale voltage generating circuit to the pixel electrode, a bias line configured for supplying a bias current to the output amplifier, and a bias circuit generating a bias current, wherein the bias circuit of the first drive circuit includes a terminal outputting the bias current generated by the bias circuit of the first drive circuit, the bias circuit of the second drive circuit is configured to connect the bias line of the second drive circuit to the terminal outputting the bias current generated by the bias circuit of the first drive circuit, and based on the connection of bias line of the bias circuit of the second drive circuit to the terminal, each of the output amplifier of the first drive circuit and the output amplifier of the second drive circuit is input with the bias current generated by the bias circuit of the first drive circuit rather than being input with bias current generated by the bias circuit of the second drive circuit.

7. A display device according to claim 6, wherein
the first drive circuit and the second drive circuit each can select a master mode or a slave mode,
the bias line is connected to the bias circuit provided in the drive circuit in the master mode, and
the bias line is connected to an input terminal of a reference voltage output from the other drive circuit in the slave mode.

8. A display device according to claim 6, wherein
the first drive circuit has an output terminal outputting a reference current output from the bias circuit, and
the supply of the reference voltage from the first drive circuit to the second drive circuit is carried out with the reference current output from the bias circuit.

9. A display device according to claim 6, wherein
the first drive circuit includes a band-gap circuit generating a reference voltage.

10. A display device according to claim 6, wherein
the display panel is a liquid crystal display panel having a liquid crystal composition sealed between a pair of substrates.

11. A display device comprising:
a display panel having a plurality of pixels arranged in a matrix, wherein the matrix includes a plurality of video signal data lines and a plurality of scanning signal lines, and wherein each of the pixels is coupled to one of the video signal data lines and one of the scanning signal lines;
the plurality of pixels each having a pixel electrode,
a printed circuit board connected to the display panel; and
a first drive circuit and a second drive circuit mounted on the display panel or the printed circuit board, wherein the first drive circuit is connected to a first group of the video signal data lines to provide video signals to a first group of the pixels via the first group of video signal data lines, and wherein the second drive circuit is connected to a second group of the video signal data lines, different from the first group of video signal data lines, to provide video signals to a second group of the pixels via the second group of video signal data lines, each of the first drive circuit and a second drive circuit including a gray scale voltage generating circuit generating a gray scale voltage to be applied to the pixel electrode based on a gray scale reference voltage, a reference gray scale voltage circuit generating the gray scale reference voltage, and a gamma correction circuit correcting a potential of the gray scale voltage generated in the gray scale voltage generating circuit, wherein the gamma correction circuit of the second drive circuit is connected to the reference gray scale voltage circuit of the first drive circuit, and each of the gamma correction circuit of the first drive circuit and the gamma correction circuit of the second drive circuit are configured to correct the potential of the gray scale voltage based on the gray scale reference voltage generated in the reference gray scale voltage circuit of the first drive circuit rather than based on the gray scale reference voltage generated in the reference gray scale voltage circuit of the second drive circuit.

12. A display device according to claim 11, wherein
the first drive circuit and the second drive circuit each can select a master mode or a slave mode,
the reference gray scale voltage circuit provided in the drive circuit and the gamma correction circuit are connected to each other in the master mode, and
an input terminal of a gray scale reference voltage output from the other drive circuit is connected to the gamma correction circuit in the salve mode.

13. A display device according to claim 11, wherein
the reference gray scale voltage circuit of the first drive circuit and the gamma correction circuit of the second drive circuit are connected to each other via a wiring of the display panel and a wiring of the printed circuit board.

14. A display device according to claim 11, wherein
the reference gray scale voltage circuit and gamma correction circuit both in the first drive circuit are connected to each other via a wiring of the display panel and a wiring of the printed circuit board, and
the reference gray scale voltage circuit of the first drive circuit and the gamma correction circuit of the second drive circuit are connected to each other via the wiring of the display panel and the wiring of the printed circuit board.

15. A display device according to claim 11, wherein
the gamma correction circuit includes a variable resistance circuit.

16. A display device according to claim 11, wherein
the display panel is a liquid crystal display panel having a liquid crystal composition sealed between a pair of substrates.

17. A display device according to claim 1, further comprising a scanning signal line drive circuit coupled to said scanning signal lines to provide scanning signals to the first and second groups of pixels via the scanning signal lines.

18. A display device according to claim 6, further comprising a scanning signal line drive circuit coupled to said scanning signal lines to provide scanning signals to the first and second groups of pixels via the scanning signal lines.

19. A display device according to claim 11, further comprising a scanning signal line drive circuit coupled to said scanning signal lines to provide scanning signals to the first and second groups of pixels via the scanning signal lines.

* * * * *